(12) United States Patent
Bland et al.

(10) Patent No.: US 7,275,734 B2
(45) Date of Patent: Oct. 2, 2007

(54) TOWER/FRAME STRUCTURE AND COMPONENTS FOR SAME

(75) Inventors: James A. Bland, Rhome, TX (US); Jesse Q. Seawell, Granbury, TX (US); Dustin L. Troutman, Hopewell, PA (US); Shane E. Weyant, Bedford, PA (US); Charles J. Bardo, Keller, TX (US)

(73) Assignee: Composite Cooling Solutions, L.P., Fort Worth, TX (US)

( * ) Notice: Subject to any disclaimer, the term of this patent is extended or adjusted under 35 U.S.C. 154(b) by 0 days.

(21) Appl. No.: 11/216,752

(22) Filed: Aug. 31, 2005

(65) Prior Publication Data

US 2006/0053727 A1    Mar. 16, 2006

Related U.S. Application Data

(60) Provisional application No. 60/609,300, filed on Sep. 13, 2004.

(51) Int. Cl.
*B01F 3/04* (2006.01)
*E04C 3/36* (2006.01)

(52) U.S. Cl. ............... 261/28; 261/DIG. 11; 52/732.2; 52/736.2; 52/737.2; 52/737.6

(58) Field of Classification Search ............... 261/28, 261/29, 30, 36.1, 97, 110, DIG. 11; 29/525.01, 29/897.33, 897.35; 52/731.1, 731.3, 732.1, 52/732.2, 737.1, 737.2, 737.4, 737.6
See application file for complete search history.

(56) References Cited

U.S. PATENT DOCUMENTS

| | | | |
|---|---|---|---|
| 4,557,091 A | 12/1985 | Auer | |
| 5,028,357 A | 7/1991 | Bardo | |
| 5,054,197 A | 10/1991 | Kato et al. | |
| 5,155,961 A * | 10/1992 | Bardo | 52/646 |
| 5,236,625 A | 8/1993 | Bardo et al. | |
| 5,423,251 A * | 6/1995 | Kolvites et al. | 100/110 |
| 5,503,493 A * | 4/1996 | Kato et al. | 403/312 |
| 5,585,047 A * | 12/1996 | Mortensen et al. | 261/109 |
| 5,851,446 A | 12/1998 | Bardo et al. | |
| 5,902,522 A | 5/1999 | Seawell et al. | |
| 6,189,285 B1 | 2/2001 | Mockry | |
| 6,237,900 B1 * | 5/2001 | Drew et al. | 261/111 |
| 6,272,796 B1 * | 8/2001 | Metzler | 52/93.1 |
| 6,516,583 B1 * | 2/2003 | Houghton | 52/655.1 |
| 6,591,573 B2 * | 7/2003 | Houghton | 52/656.9 |

* cited by examiner

*Primary Examiner*—Scott Bushey
(74) *Attorney, Agent, or Firm*—Munck Butrus, P.C.; Robert D. McCutcheon

(57) ABSTRACT

A tower/frame structure of interconnected columns and beams (which may be used in a cooling tower) and novel columns, beams, connection mechanisms and other components are provided. In one embodiment, a column and a beam are constructed of pultruded composite fiber-reinforced plastic (FRP) materials. The beam includes two sidewall extensions or flanges (each having one or more attachment apertures) at one end and which are integral with the beam for connection to the column (having one or more corresponding attachment apertures). The dimension/spacing between the inner walls of the two flanges substantially equals or is slightly larger than the outer dimension of the column. The attachment holes are aligned and a fastener is inserted through the extensions and column for attaching the column and beam. The C-shaped end of the beam substantially conforms to the cross-sectional shape and dimensions of the column. Additional plastic components, such as a firewall and toe/trim member, for use in a cooling tower are also provided.

58 Claims, 15 Drawing Sheets

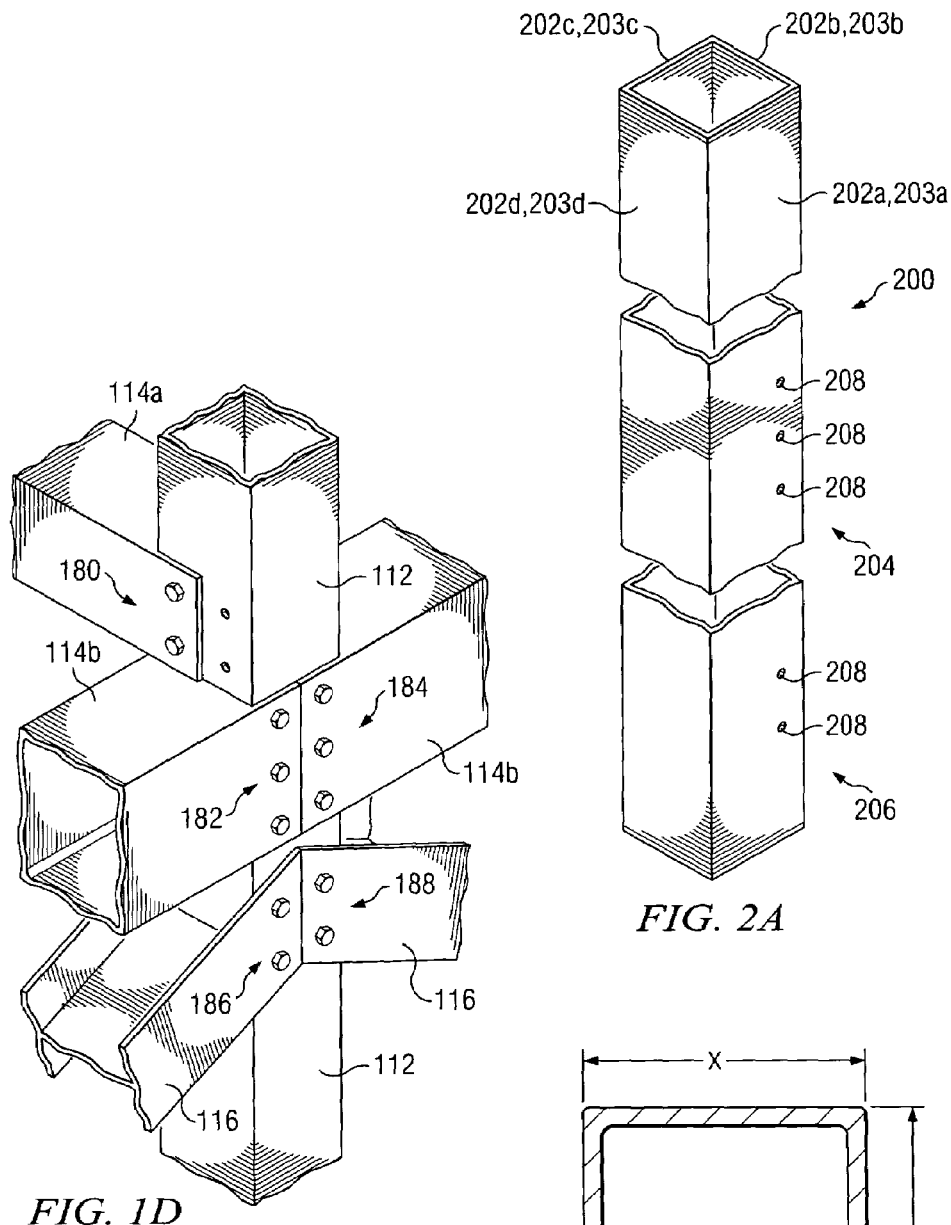
FIG. 1D
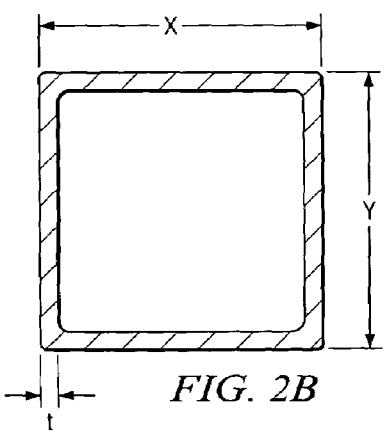
FIG. 2A
FIG. 2B

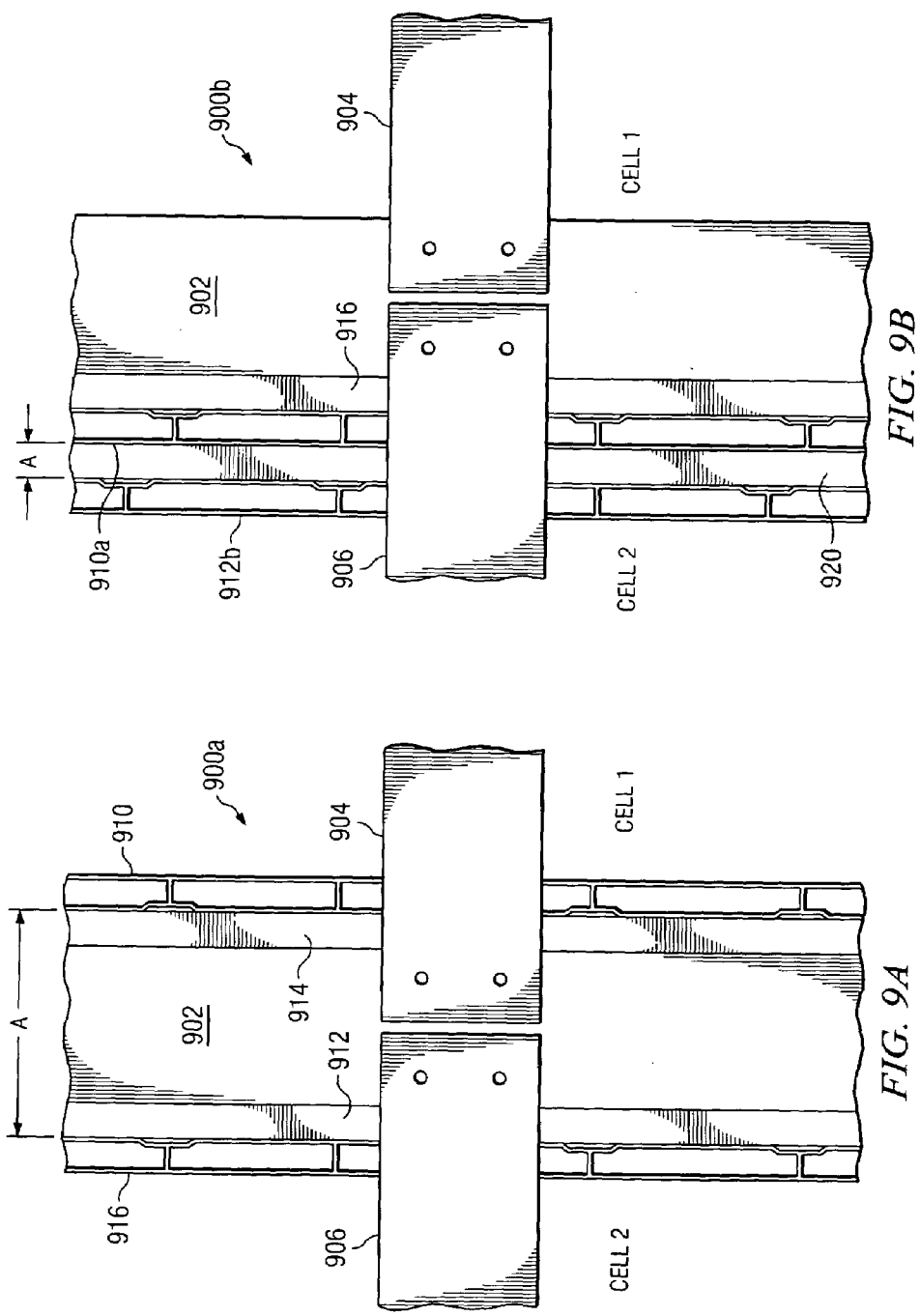

TOWER/FRAME STRUCTURE AND COMPONENTS FOR SAME

CROSS REFERENCE TO RELATED APPLICATION

This application claims priority under 35 USC 119(e) to U.S. provisional Application Ser. No. 60/609,300, filed on Sep. 13, 2004, and which is incorporated herein by reference.

TECHNICAL FIELD OF THE INVENTION

The present invention relates to tower and frame structure and components for building same, and in particular, to a cooling tower and cooling tower/frame structure and components for same.

BACKGROUND

As previously described in U.S. Pat. No. 5,851,446 to Bardo, et al (1998) and U.S. Pat. No. 5,902,522 to Seawell, et al. (1999), of which some portions are reproduced hereinafter, cooling towers are used to cool liquid by contact with air. Many cooling towers are of the counter-flow type, in which the warm liquid is allowed to flow downwardly through the tower and a counter current flow of air is drawn by various means upward through the falling liquid to cool the liquid. Other designs utilize a cross-flow of air, and forced air systems. A common application for liquid cooling towers is for cooling water to dissipate waste heat in electrical generating and process plants and industrial and institutional air-conditioning systems.

Most cooling towers include a tower or frame structure. This structural assembly is provided to support dead and live loads, including air moving equipment such as a fan, motor, gearbox, drive shaft or coupling, liquid distribution equipment, such as distribution headers and spray nozzles, and heat transfer surface media such as a fill assembly. The fill assembly material generally has spaces through which the liquid flows downwardly and the air flows upwardly to provide heat and mass transfer between the liquid and the air. Different types of fill materials, e.g., stacked layers of open-celled clay tiles, are commercially available, depending on the desired design and operating characteristics. This fill material is heavy, and can weigh in excess of 50,000 pounds for a conventional size air conditioning cooling tower. As such, the tower frame/structure and other structural parts of a cooling tower must not only support the weight of the fill material and other components, but must also resist wind forces or loads and should be designed to withstand earthquake loads.

Due to the corrosive nature of the great volumes of air and water drawn through such cooling towers, it has been the past practice to either assemble such cooling towers of stainless steel or galvanized and coated metal, or for larger field assembled towers, to construct such cooling towers of wood, which is chemically treated under pressure, or concrete at least for the structural parts of the tower, or combination of these materials.

Metal structures and parts of cooling towers can be corroded by the local atmosphere or the liquid that is being cooled, depending on the actual metal used and the coating material used to protect the metal. Further, such metal towers are usually limited in size and are also somewhat expensive, especially in very large applications such as for cooling water from an electric power generating station condenser. Concrete is very durable, but towers made of concrete are expensive and heavy. Many cooling towers are located on roofs of buildings, and the weight of a concrete cooling tower can present building design problems. Plastic parts are resistant to corrosion, but prior plastic parts ordinarily would not provide enough strength to support the fill material and the weight of the tower itself.

Wood has been used for the structural parts of cooling towers, but wood also has its disadvantages. Wood towers may require expensive fire protection systems. The wood may decay under the constant exposure not only to the environment, but also to the hot water being cooled in the tower. Wood that has been chemically treated to increase the useful life may have environmental disadvantages: the chemical treatment may leach from the wood into the water being cooled. Fiber reinforced plastic has been used as a successful design alternative to wood and metal.

Within the last decade or so, prior art solutions began using fiber reinforced plastic beams and columns including those shown in U.S. Pat. No. 5,236,625 to Bardo et al. (1993) and U.S. Pat. No. 5,028,357 to Bardo (1991), both of which are incorporated herein by reference. Both patents disclose prior art structures for cooling towers. Thus, while these prior fiber reinforced plastic tower structures have solved many of the problems associated with wood and metal cooling tower structures, the solutions to the problem of resistance to lateral loading have increased the costs of these units. Both the shear wall and laterally braced frames can be labor intensive to build, since there are many parts and many connections to be made. With these prior art solutions, there exist a large number of key structural elements, with more complex manufacturing and inventorying of parts, increasing the complexity of construction, and therefore the costs.

As such, a need existed for a lower cost cooling tower structure, and for lower cost cooling tower structures that meet less exacting design criteria. Further, in those fiber reinforced plastic frame structures at the time, one difficulty with the joint between the columns and beams was that when constructed with conventional bolts or screws, the beams and columns could rotate with respect to each other. When tighter connections were attempted to be made with conventional bolts or screws to limit the rotation and provide lateral stability without adding diagonal bracing, the fiber reinforced plastic material could be damaged, and the problem worsened as the connecting members might degrade the fiber reinforced plastic and enlarge the holes in which they are received.

Some of the problems of these prior art systems were alleviated or reduced with new fiber reinforced cooling tower systems and methods of construction as described in U.S. Pat. No. 5,851,446 to Bardo, et al. (1998) and U.S. Pat. No. 5,902,522 to Seawell, et al. (1999), both of which are incorporated herein by reference. As described therein, the fiber-reinforced plastic (FRP) beams and columns were connected using mounting plates and bonding adhesive. As noted in these patents, one advantage of this prior art system allows a theoretical increase in the size of the bays, instead of the standard bay with columns spaced apart a distance of six feet, such bays arguably can be increased to provide bays with up to twelve feet between columns. However, the use of mounting plates and bonding adhesive increases the number of components, time and expense in assembling the structure. Moreover, larger bays constructed in accordance with prior art structures may be unlikely to meet the design criteria necessary to support the cooling tower components and structures, unless larger, stronger and more costly components are utilized.

Accordingly, there is a need for a cooling tower and tower/frame structure having fewer beams and columns, and fewer overall components, that reduce costs and time to assemble, while meeting the overall design criteria. Moreover, there is needed a tower and structure that provides for increased spacing of columns (larger bays) and provides a modular design thereby allowing additional bays to be added with minimal or no additional design efforts. Further needed are specially-designed and novel columns and beams with predetermined structural shapes, and novel column-beam connections and methods, that provide a structurally strong, simple and easy to assemble tower/frame structure.

SUMMARY

In accordance with one aspect of the present invention, there is provided a support structure having an elongated column having a rectangular cross-sectional shape. The column includes a first side having an outer surface, a second side having an outer surface, a third side and a fourth side. At least one aperture or opening extends through the column and through the first and second sides of the column. The structure further includes an elongated beam having a first end and a second end, and a first side and a second side with each side extending between the first end and the second end. The beam further includes a first flange having a first aperture and extending outward from the first side of the beam and integrally formed as a portion of the first side. The first flange is positioned adjacent the outer surface of the first side of the column such that the first aperture aligns with the opening in the column. A second flange is provided having a second aperture and extending outward from the second side of the beam and integrally formed as a portion of the second side. The second flange is positioned adjacent the outer surface of the second side of the column such that the second aperture aligns with the opening in the column. A fastener extends through each of the first aperture, the second aperture and the opening in the column and operable for coupling the beam to the column.

In another embodiment, there is provided an elongated beam structure having a first end, a second end and a body extending from the first end to the second end, the body having a first wall member, a second wall member and a third wall member, each wall member extending from the first end to the second end. At the first end, a first flange extends outward from the first wall member and integrally formed as a portion of the first wall member. Also, at the first end, a second flange extends outward from the second wall member integrally formed as a portion of the second wall member. The beam is a single unitary component formed of pultruded composite fiber-reinforced material. Further, the first flange, second flange and third wall member form a C-shaped coupling at the first end of the beam and operable for coupling to a rectangular column.

In yet another embodiment, there is provided a cooling tower having a support frame structure that defines an interior volume. The frame structure includes a plurality of vertical columns, and at least one beam, made of a material comprising reinforcing fibers, and having a first end and a second end and connected to a pair of the vertical columns. The beam includes a body extending from the first end to the second end, with the body having a first wall member, a second wall member and a third wall member, where each wall member extends from the first end to the second end. At the first end, a first flange extends outward from the first wall member and is integrally formed as a portion of the first wall member. At the first end, a second flange extends outward from the second wall member and is integrally formed as a portion of the second wall member. The first flange, second flange and third wall member form a C-shaped coupling at the first end of the beam for coupling to one of the vertical columns. The cooling tower further includes a fluid distribution system to distribute fluid and heat transfer material within the interior volume defined by the support frame, where the heat transfer material receives fluid from the fluid distribution system through which the fluid travels, and air moving equipment for causing air to move through the heat transfer material.

In still another embodiment of the present invention, there is provided a method of constructing a support structure. An elongated column is provided having a rectangular cross-sectional shape, the column having a first side having an outer surface, a second side having an outer surface, a third side and a fourth side, and at least one aperture extending through the column and through the first side and the second side of the column; An elongated beam is provided having a first end and a second end, a first side and a second side with each side extending between the first end and the second end, a first flange having a first aperture and extending outward from the first side of the beam and integrally formed as a portion of the first side, and a second flange having a second aperture and extending outward from the second side of the beam and integrally formed as a portion of the second side. The first flanged is positioned adjacent the outer surface of the first side of the column such that the first aperture aligns with the aperture of the column, and the second flange is positioned adjacent the outer surface of the second side of the column such that the second aperture aligns with the aperture of the column. The method further includes extending a fastener through each of the first aperture, the second aperture and the aperture in the column to couple the beam to the column.

In still another embodiment, there is provided a firewall having a plurality of vertical columns. A first wall panel includes a first outer wall and a second outer wall. The first outer wall is laterally spaced from the second outer wall by a first predetermined distance. A second wall panel is provided that is laterally spaced apart from the first wall panel by a second predetermined distance. The second wall panel includes a first outer wall and a second outer wall. The first outer wall is laterally spaced from the second outer wall by a third predetermined distance. Both the first and second wall panels include fiber reinforced pultruded composite material. The first and second wall panels are coupled to and extend between a first column and a second column of the plurality of columns and the firewall separates a first area of a structure from a second area of the structure, and wherein the first and second columns provide load-bearing support for the structure.

In yet another embodiment, there is provided an outer casing support member for a tower structure. The support member includes an elongated central member extending a predetermined length and having a longitudinal axis. A first wall member is coupled to the central member and extends laterally away from the longitudinal axis. This first wall member includes a first portion and a second portion configured to have an L-shaped cross section. A second wall member is coupled to the central member and extends laterally away from the longitudinal axis, and a third wall member is coupled to the central member and extends laterally away from the longitudinal axis. The first wall member, the second wall member, and the third wall member each extend approximately at a right angle from an adjacent wall member. An area defined between the first wall member and the second wall member is operable to receive an edge of outer casing material. One of the second and third wall members provides an attachment support for attachment to one or more vertical columns in a structure. The casing support member is a single unitary component formed of composite fiber-reinforced material.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 1D illustrates several connections or anchor points between a column and the beams and diagonal brace members;

FIGS. 2A and 2B illustrate a perspective view (FIG. 2A) and a side cross-sectional view (FIG. 2B) of a column in accordance with present invention;

FIGS. 9A and 9B illustrate different embodiments of a firewall including multiple double wall panels, in accordance with present invention.

DETAILED DESCRIPTION OF THE INVENTION

A prior art cooling tower and frame structure is described in U.S. Pat. No. 5,902,552 to Seawell, et al. (1999), which has been previously incorporated herein by reference.

Figure 1A:
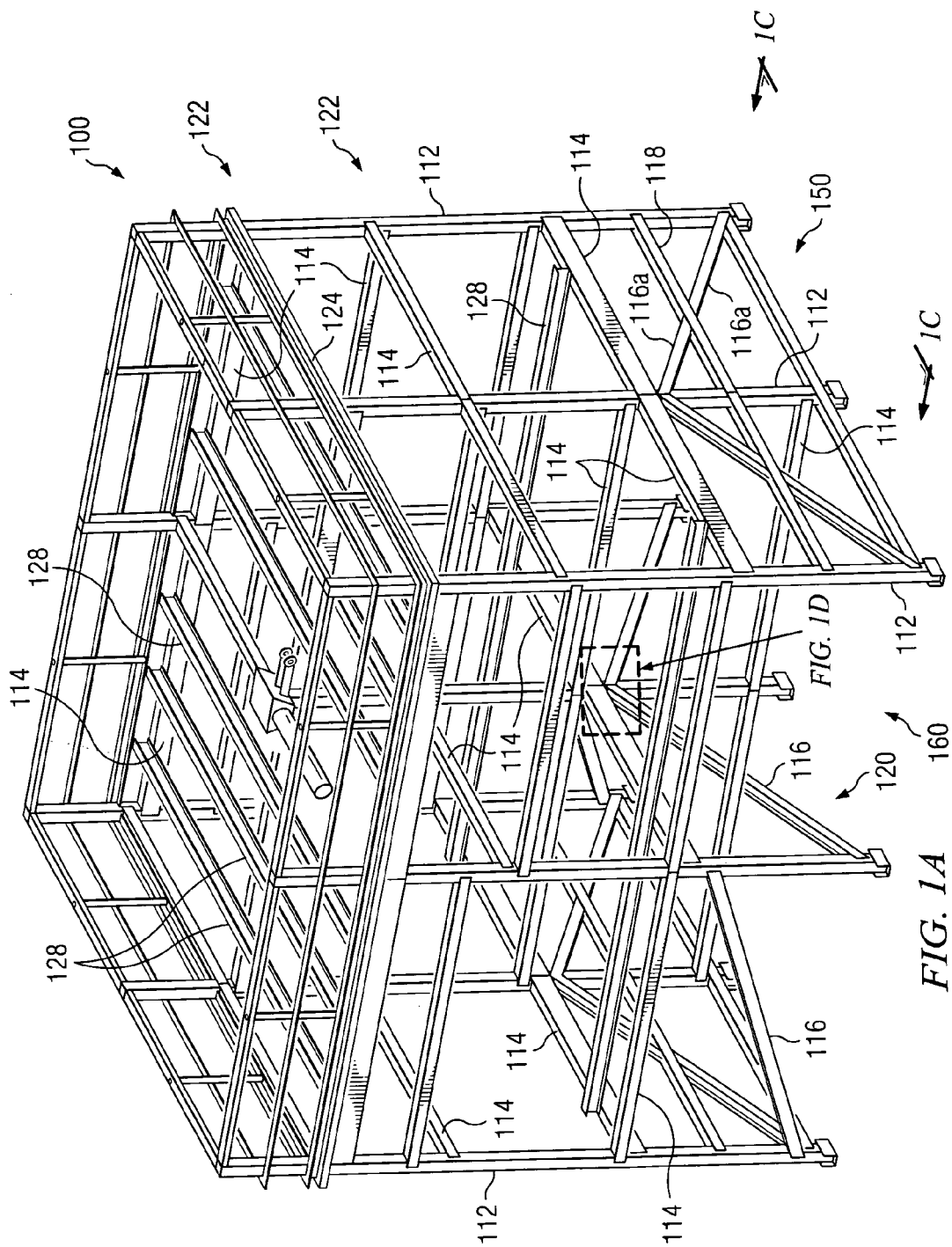
FIG. 1A is a perspective view of a tower/frame structure in accordance with the present invention.

Now referring to FIG. 1A, there is shown a tower/frame structure generally designated 100, in accordance with the present invention, that includes a plurality of vertical columns 112 and a plurality of horizontal beams 114. Diagonal bracing members 116 are included to provide lateral stability and resistance to wind and earthquakes. Additional diagonal bracing members 116a and beams 118 are provided for additional stability, and may be optional, depending on the desired load characteristics and criteria. The term "beam" as used herein, refers to the beams 114 and also to the bracing members 116, 116a. As will be appreciated, the structure 100 is shown generally including the structural support members of a tower structure intended to support additional components or materials.

In the embodiment shown, the columns 112 are spaced a predetermined distance to provide bays. The column spacing distances may be the same or different, thus different embodiments may have different sized bays having footprints that are square or rectangle. In different embodiments, the spacing between columns 112 can be any distance, and usually ranges between eight and twenty feet, and more particularly between twelve and eighteen feet, and in one embodiment is about twelve feet or greater, and preferably between fourteen to sixteen feet. The structure 100 has several tiers or levels, including an air inlet level 120 and upper levels 122. Further, the distance between each level may be different or the same, as desired.

When used in a cooling tower, the upper levels 122 carry fill material, a water distribution system and air intake equipment and/or other components (not shown in FIG. 1A). In a counterflow cooling tower, a large diameter fan and motor (not shown in FIG. 1A) are mounted on a roof 124 to draw air from air intake level 120 and through the upper levels 122 to exit. As will be understood, the structure 100 and other elements and components described herein, are not limited to use in a cooling tower, but may be used as, and in, a structural frame to support any type of equipment or components or for any purpose or building structure. Moreover, FIG. 1A illustrates but one example of the structure 100 having four bays. Additional bays and configurations may be included, as desired.

Additional joist members 128 rest on one or more beams 114 and function to support a floor or the other components at desired levels of the structure 100.

Figure 1B:
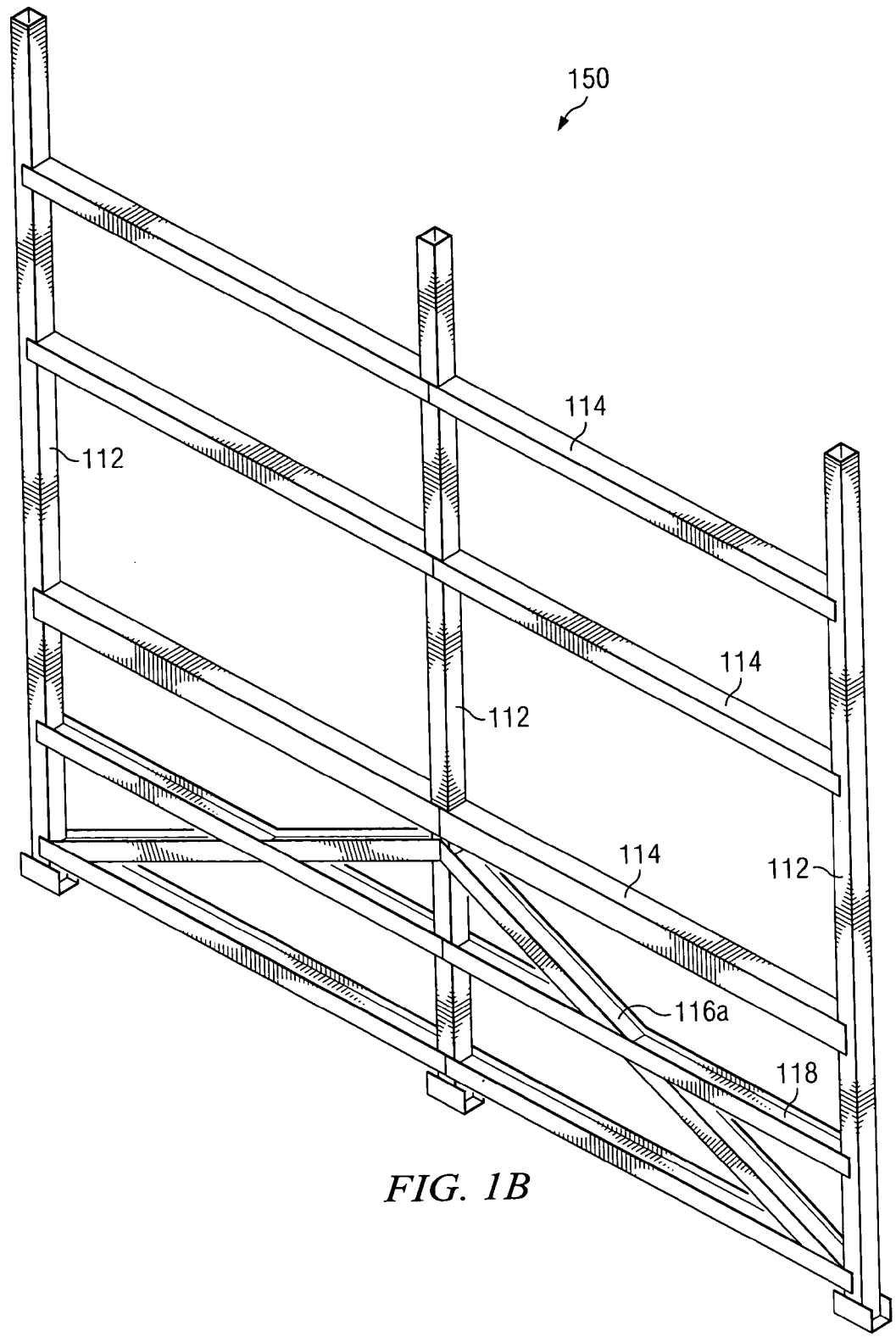
FIGS. 1B and 1C illustrate a first bent line (along B-B of FIG. 1A) of the structure 100 and a second bent line 160 (along B-B of FIG. 1A with the first bent line 150 removed)
Figure 1C:
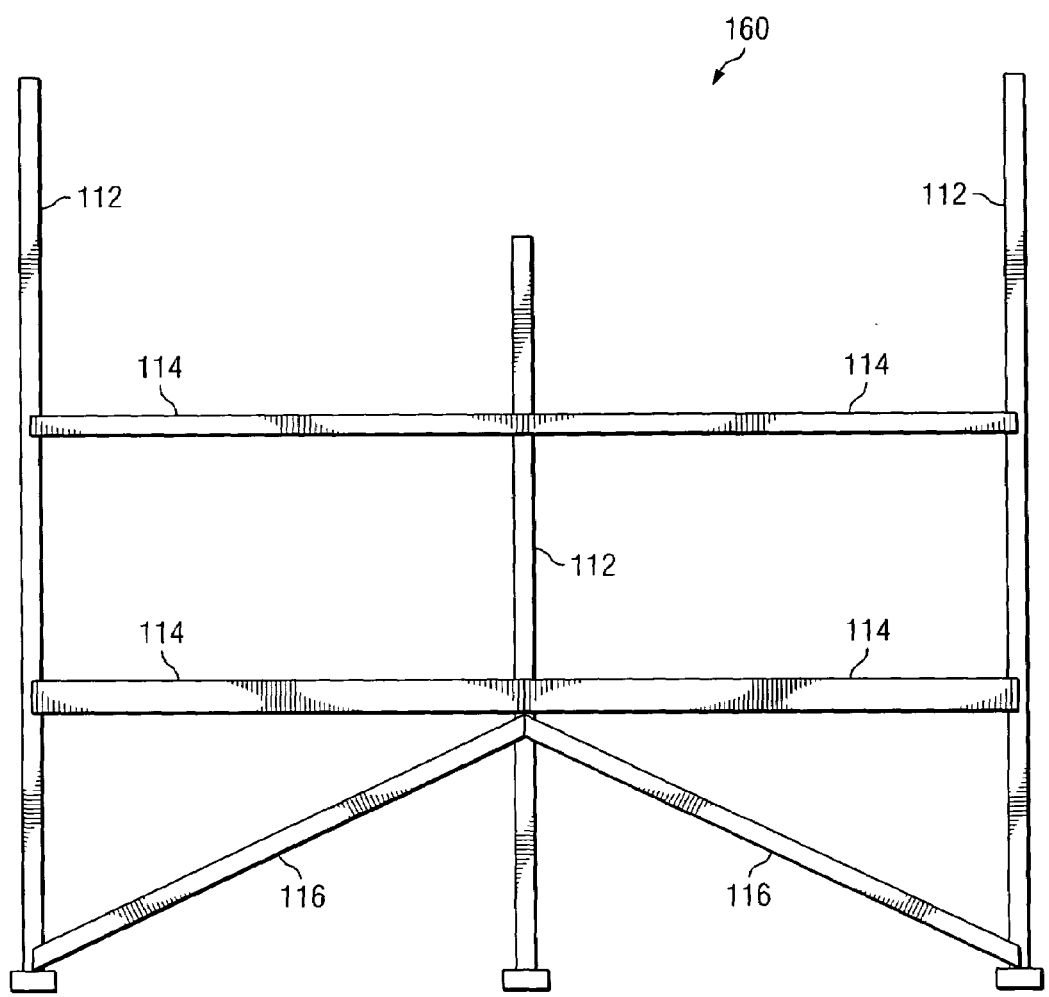

Now referring to FIGS. 1B and 1C, there is shown a first bent line 150 (along B-B of FIG. 1A) of the structure 100 and a second bent line 160 (along B-B of FIG. 1A with the first bent line 150 removed). As the structure 100 is illustrated with four bays, there are three bent lines (two outer and one inner bent lines). As shown, the center column 112 of the bent line 160 is shorter than the outer most columns, as the extra length of the outermost columns is utilized as a post for a fence erected around the roof 124 of the structure 100.

One significant advantage of the present invention is found during construction of the tower frame/structure. Once two bent lines (such as bent lines 150 and 160) are erected and a set of cross beams (or members) is in place, using the columns, beams and connections disclosed herein, the structure has substantial load carrying capability at most or all points along the beams and columns. This provides a high standard of fall protection for workers during construction of the remaining structure. For example, workers may utilize retractable safety lines for anchoring at one of many possible attachment points. Workers may then move about the structure without having to re-anchor the safety line before moving to another location. In most designs in accordance with the invention taught herein, it is likely that this structure will meet or exceed United States OSHA standards (5000 lb. attachment or anchor point loads) for fall protection.

Now referring to FIG. 1D (showing a close-up of Detail A of FIG. 1A), there are illustrated several connections or anchor points 180, 182, 184, 186, 188 between a column 112 and the beams 114a, 114b, 114c and diagonal brace members 116. The column 112 includes a plurality of attachment holes therein, while each of the beams 114a, 114b, 114c and diagonal brace members 116 have one or more attachment holes for alignment with corresponding holes in the column 112. Once aligned, a fastener (not shown in FIG. 1D) is inserted into the aligned holes to connect the respective beam or member to the column 112.

As will be appreciated, the fastener may include any type of mechanical fastener known to those of ordinary skill in the art, including bolts, screws and pins, and constructed of any suitable material suitable for the structure 100 application (e.g., non-corrosive such as galvanized or stainless, if used in a cooling tower application). The attachment holes in each of the column 112, beams 114a, 114b and 114c and the members 116 are shown as pre-formed or pre-drilled. These may be formed any time prior to the assembly of the connections 180, 182, 184, 186, 188, and further may formed at the time of assembly of the connections. In one embodiment, a pin is utilized as the fastener, in conjunction with the novel design aspects of the column 112, beams 114, members 116, 118 and the connections and connecting mechanism (as shown in FIG. 1D). As such, in this embodiment, a fastener with a tightening function may not be necessary as a connection pin will usually carry the necessary load and provide moment stability (and as further described below).

Now referring to FIGS. 2A and 2B, there is provided a perspective view (FIG. 2A) and a side cross-sectional view (FIG. 2B) of a column 112 and designated using the reference numeral 200, in accordance with present invention. The column 200 has four sides 202a, 202b, 202c, 203d (each side having a surface), with each side having a respective sidewall 203a, 203b, 203c and 203d. As shown, the cross-sectional shape of the column 200 is square. Other rectangular shapes may be used. The sides and sidewalls have outer dimensions X and Y (as shown in FIG. 2B), these may also be referred to as cross-sectional dimensions. (The references X and Y do not necessarily reflect the x and y directions in an xyz coordinate system, but are used for reference only.)

As illustrated, the column 200 is substantially hollow (though the column 200 may include inner walls for additional strength, if desired). Each sidewall has a thickness t. In one embodiment, the thickness t is substantially the same for each sidewall. In other embodiments, the thickness t may be the same for each sidewall in a pair of respective opposing sidewalls (and different among the two pairs), or different for each sidewall.

The dimensions X and Y may be chosen as desired, and may further be different from each other (rectangular) or substantially the same (square). As will be appreciated, it may be beneficial for the column 200 to be square (dimension X equals dimension Y) to allow the beams and members connected thereto to utilize a standard length flange or extension (of any beam) for the connection. In one specific embodiment, X and Y are approximately 6 inches, and the thickness t is approximately ⅜ inch. In another embodiment, both X and Y are about 4 inches or greater. Other dimensions may be used. Dimensions X and/or Y reflect the outside dimension (OD) of a given cross-section, as the case may be, of the column 200.

The length of the column 200 is generally equal to the desired height of the structure 100 (with some columns shorter or longer than others, as per design). In one embodiment, the column 200 is a single, unitary piece, with lengths ranging from ten to seventy feet. In other embodiments, depending on the desired height of the structure 100 and other deign considerations, the column 200 may be constructed from two or more pieces that are connected or spliced together.

Column 200 may be constructed from wood, steel or other metal, or fiber-reinforced plastic (FRP) or other composite materials.

The column 200 includes one or more sets 204, 206 of attachment holes, apertures or openings 208 (hereinafter referred to as "holes"), with each set including one or more pairs of attachment holes 208. A particular set 204, 206 of attachment holes 208 are formed through one of the sidewalls and its respective opposite sidewall, thus a pair of corresponding attachment holes (one located on one sidewall and the other on the opposite sidewall) are operable for receiving a fastener therethrough both aligned holes. When inserted, the fastener extends through the entire cross-section of the column 200. Each set 204, 206 of attachment holes 208 corresponds to another set of attachment holes 208 (not shown) in one of the beams 114, 116, 118 that are to be connected/attached to the column 200 (i.e., column 112).

The location (height) of the attachment holes 208 along the column 200 depends on the location of the desired connection point with a particular beam. The number of attachment holes 208 per connection (column-beam connection) may be chosen as desired, and may include one, two, three, four or more holes (as desired and/or depending on the size and shape of the particular beam). The attachment holes 208 may be formed by a suitable process or fabrication method, such as by any drilling or cutting method (or other material removal means) and the like. As noted above, the holes may be formed during the actual erection of the structure 100, but may be advantageously pre-formed at some point prior to construction (such as during the column fabrication process or shortly thereafter).

Each set 204, 206 of attachment holes 208 (in sidewalls 203a and 203c) for a particular column-beam connection is positioned closer (or nearer) to one of the sidewalls 203b than the other sidewall 203d, as shown. This advantageously allows for another beam placement and column-beam connection (via attachment holes through sidewalls 203a and 203c but nearer the sidewall 202d, not shown) to be made on the opposite side (180 degrees) of the column 200 (e.g., see FIG. 1D and connection points 182 and 184 for beams 114b). In one specific embodiment, the sets of attachment holes 204, 206 are laterally spaced from the sidewall 202b approximately one inch and laterally spaced more than one inch from the sidewall 202d), and the diameter/dimension of the holes is about ½ inch. Other lateral spacings and attachment hole diameters/dimensions may be utilized, including centering the set of attachment holes (in the event that no additional column/beam connection will be made at that vertical height). As will be appreciated, the attachment holes 208 as shown are circular, but may other shapes, e.g., slotted, square, rectangle, oval, etc., if desired.

Additionally, the positioning of the particular attachment holes 208 to a sidewall (closer to one of the sidewalls than the mid-point of the column 200 where a beam will extend outward from that particular sidewall) helps reduce or eliminate "creep." In prior art systems, the fasteners are tightened to increase moment resistance of the connection. Since connection points always generally become loose due to wear, there is a desire to tighten the fasteners as tight as possible to ensure moment resistance. However, when fasteners are placed in the midpoint of a hollow FRP column, there is an opportunity to overtighten the fastener and the FRP structure. As such, crush-resistant sleeves are typically utilized. It has been determined by the inventors, that when the position of the fastener is closer to the sidewall than the midpoint, tightness of the connection is not as critical because, a connection in accordance with the present invention, provides sufficient moment resistance without the need for substantial tightening of the fastener about the connection point that might result in crushing the column 200. Thus, tightening needs are significantly reduced, thus eliminating any sleeves or plates. It has been determined that pins may be utilized as the fasteners, however, for safety and cost reasons, standard bolts or screws may be more advantageous.

Figure 2C:
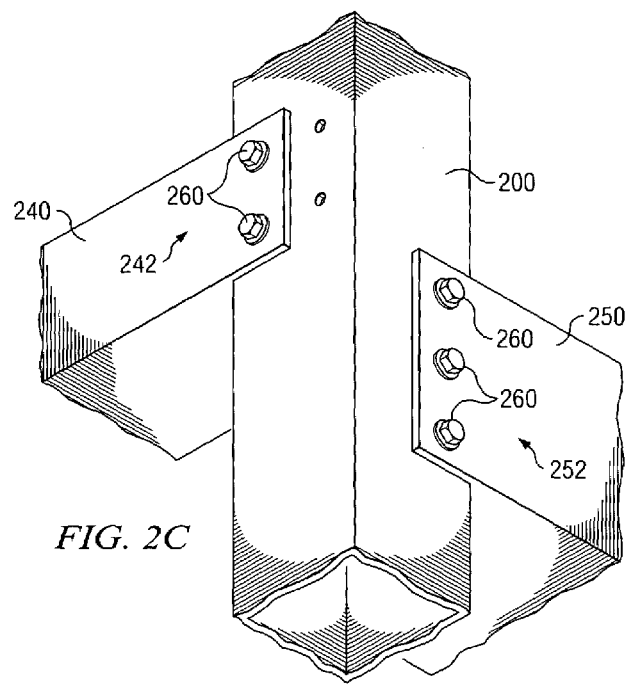
FIG. 2C shows one example of a vertical column and connected first and second beams 300.

Now referring to FIG. 2C, there is shown one example of the vertical column 200 having a first horizontal beam 240 and a second horizontal beam 250 connected. The first beam 240 is connected at a first location along the column 200 and the second beam 250 is connected at a second location along the column 200. Each connection includes a set of attachment holes 242, 252 and plurality of fasteners 260 extending through the respective attachment holes 242, 252 and thus through the respective beam 240, 250 and the column 200. As shown, an additional set of attachment holes is provided to allow another column-beam connection of another beam (not shown) extending from the column 200 along the same plane as the beam 240. Other configurations are possible, and that shown in FIG. 2C is one example.

Figure 3A:
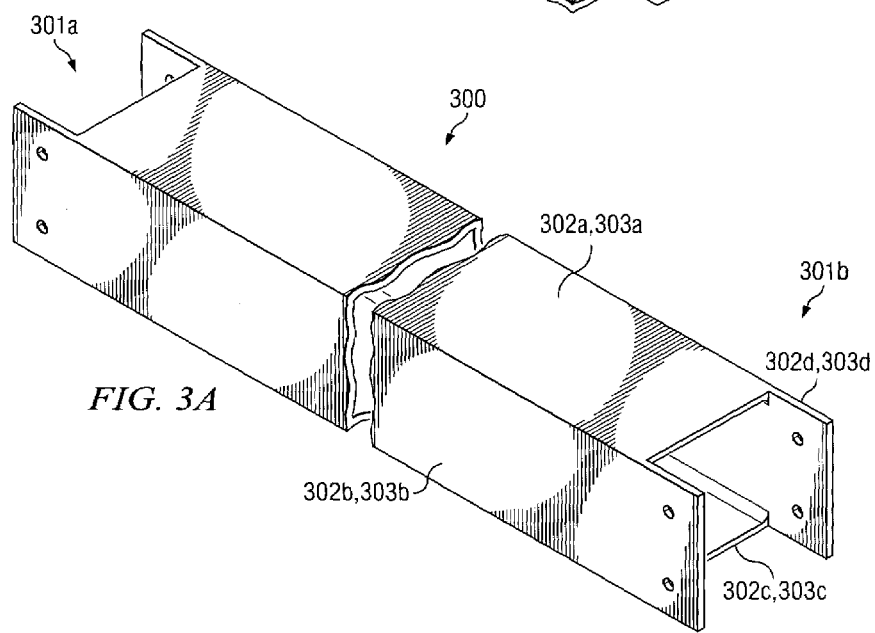
FIGS. 3A, 3B, 3C, 3D and 3E illustrate a perspective view (FIG. 3A), a detailed perspective view of one end (FIG. 3B), a first and second embodiment of side cross-sectional views (FIGS. 3C and 3D), and a top/side view of one end (FIG. 3E), all of a beam in accordance with the present invention.
Figure 3B:
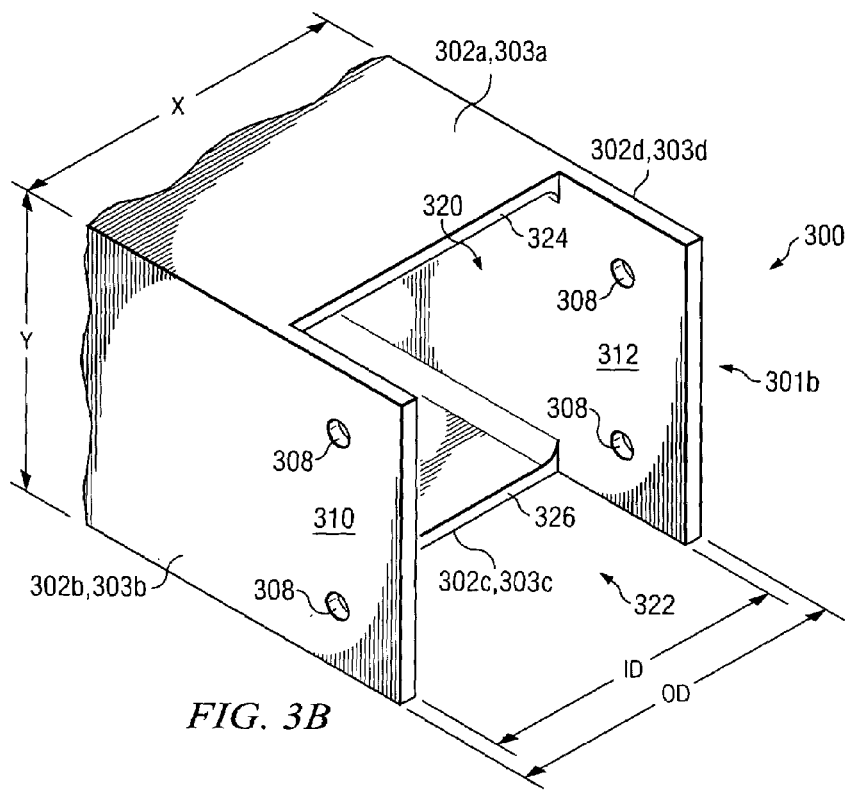
Figure 3C:
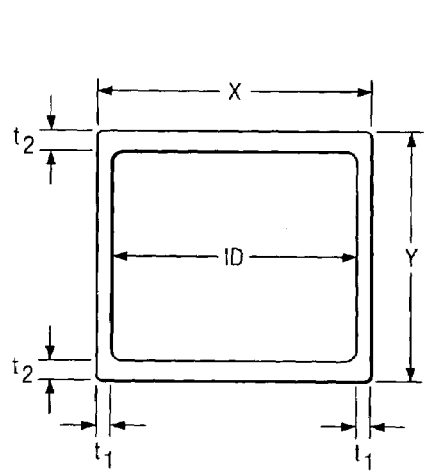
Figure 3D:
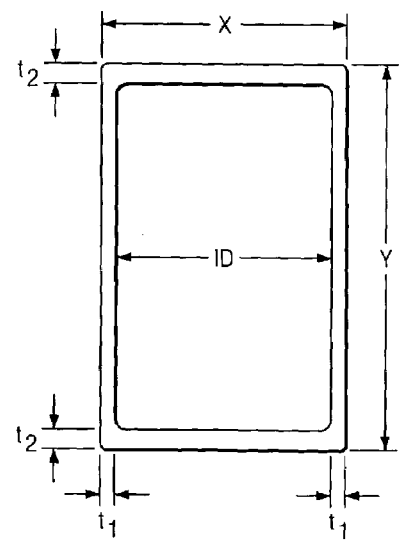

Now referring to FIGS. 3A, 3B, 3C, 3D and 3E there are shown a perspective view, a detailed perspective view of one end (FIG. 3B), a first and second embodiment of side cross-sectional views (FIGS. 3C and 3D), and a top/side view of one end (FIG. 3E) of a beam 114 and which is designated using the reference numeral 300, in accordance with present invention. The elongated beam 300 includes a first end 301a and a second end 301b, and further includes four sides 302a, 302b, 302c, 302d (each side having a surface), with each side having a respective sidewall 303a, 303b, 303c and 303d. As shown, the cross-sectional shapes of the two embodiments (FIGS. 3C and 3D) are rectangular, and may be square. Other rectangular shapes may be used. The sides and sidewalls have outer dimensions X and Y (as shown in FIGS. 3B, 3C and 3D).

Now turning specifically to FIG. 3B, one of the ends 301a, 301b of the beam 300 is shown. At the end, one side and sidewall 302b, 303b includes a first connection extension, tab or flange 310, and the opposing side and sidewall 302d, 303b includes a second connection extension, tab or flange 312. The extensions 310, 312 extend further outward than the adjacent sides and sidewalls (302a, 303a and 302c, 303c) thus forming a C-shaped end for the beam 300. The distance between the inner walls of the flange 310 and the flange 312 is referred to as an inner dimension (ID) while the distance between the outer walls is the outer dimension (OD). In one specific embodiment, the beam 300 is formed with a flush end (i.e., all sidewalls extend the same length), and material from the areas 320 and 322 is cut out or removed to form the C-shaped end, thus forming the extensions or flanges 310, 312.

The connection extensions or flanges 310, 312 provide, in essence, an integrally formed connection or mounting plate, are integrally formed with the rest of the beam 300, and operable to be positioned adjacent to the sidewalls of the column 200 and mounted to the outside of the column 200. Each of the connection extensions or flanges 310, 312 provide an area that is positioned adjacent a sidewall area of the column 200.

The extensions or flanges 310 and 312 are integrally formed, as well as unitary, with the sidewalls 303b and 303d, respectively.

The connection extensions 310 and 312 each include one or more attachment holes, apertures or openings 308 (hereinafter referred to as "holes"). The attachment holes 308 are formed through one connection extension 310 and corresponding attachment holes 308 are formed through the other connection extensions 312, and are operable for receiving a fastener therethrough both aligned holes. When inserted, the fastener extends through the entire cross-section of the beam 300. As will be appreciated, the attachment holes 308 correspond to another set of attachment holes 208 in the column 200 or in another beam (not shown).

As illustrated in FIGS. 3B, 3C and 3D, the beam 300 is substantially hollow (though the beam 300 may include inner walls for additional strength, if desired). As shown in FIGS. 3C and 3D, each sidewall has a thickness t1 or t2. In one embodiment, the thickness t is substantially the same for all sidewalls (t1 equals t2). In other embodiments, the two opposing sidewalls may have the same thickness (t1 or t2), or each sidewall may have a different thickness dimension.

The dimensions X and Y may be chosen as desired, and may further be different from each other (providing a rectangular shape) or substantially the same (square). In one specific embodiment shown in FIG. 3C, the approximate dimensions are: X (or OD)=6.56 inches, Y=6.0 inches, t1=0.25 inch, and t2=0.375 inch, resulting in the inner dimension (ID) between the flanges of approximately ID=6.062 inch (such beam is referred to by the inventors as a "tie beam"). In another specific embodiment shown in FIG. 3D, the approximate dimensions are: X=6.75 inches, Y=10.0 inches, t1=0.3 inch, and t2=0.5 inch, resulting in the inner dimension (ID) between the flanges of approximately ID=6.125 inch (such beam is referred to by the inventors as a "light beam"). In yet another specific embodiment (not shown) the approximate dimensions are: X=6.75 inches, Y=11.0 inches, t1=0.3 inch, and t2=0.5 inch, resulting in the inner dimension (ID) between the flanges of approximately ID=6.125 inch (such beam is referred to by the inventors as a "medium beam"). As will be appreciated, other X and Y dimensions and thickness t1 and t2 may be used, as desired. In another embodiment, both X and Y are at least four inches or greater. Dimensions X and/or Y reflect the outside dimension (OD) of a given cross-section, as the case may be, of the beam 300.

It will be understood that it is advantageous, and one aspect of the present invention is, to have the inner dimension (ID) (cross-section) between the flanges 310, 312 of the beam 300 to be substantially equal to (or slightly larger, given construction requirements and tolerances) the outer dimension (X or Y) of the column 200. Due to the thickness aspect of the beam 300, this results in the outer dimension (X) (measured between the outside walls of the sidewalls incorporating the flanges) of the beam 300 to be slightly larger than the column (or beam) to which it will attach/couple. As such, the columns and beams of the present invention are specifically designed to provide the necessary column-beam (or beam-beam) connection without any additional sleeves, plates, or spacers.

For example, when the outer dimension (OD) (the X or Y dimension) of the column 200 is equal to X inches, the inner dimension (ID) of the beam 300 should also be approximately X inches. Advantageously, it should be X plus a tolerance distance (small) to allow the C-shaped section of the beam 300 to be set in place around the column 200. Such tolerance distance may be in the range from zero to 0.5 inches, and more particularly is less than about 0.25 inch, and may be even smaller. Accordingly, the ID of the beam 300 is approximately equal to, or slightly larger than, the OD of the column 200 measured at the locations where the beam 300 and the column 200 attach to each other. This may also apply to the connection of two beams (where the ID of one beam is approximately the same, or slightly larger than, the OD of the other beam if two beams are attached).

Figure 3E:
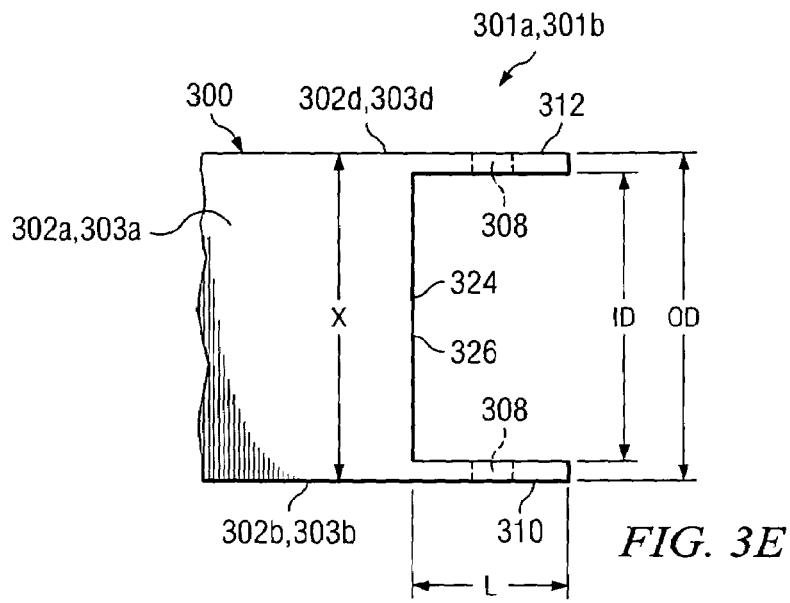
Figure 3F:
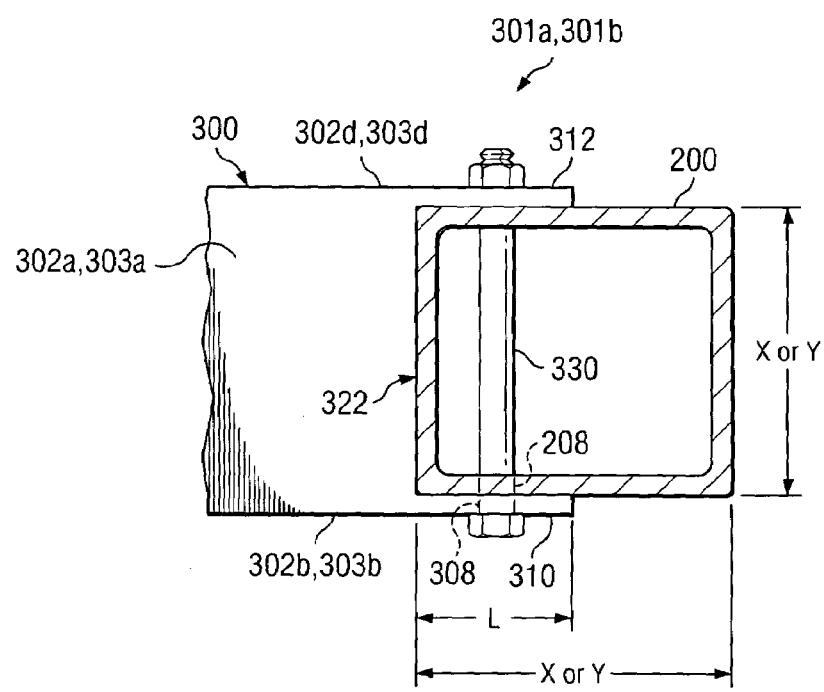
FIG. 3F shows a top view of a beam connected to a column (or a side view of a beam connected to another beam)

Now referring to FIGS. 3E and 3F, there is shown a top/side view of one end 301a, 301b of the beam 300 prior to connection to the column 200 and a top/side view after connection. As will be appreciated, given the design criteria, one end or both ends of the beam 300 may include the connection extensions or flanges, as described herein. Attachment holes 308 in the flanges 310, 312 are shown with dotted lines. Each of the flanges 310, 312 extend a length L from an outer edge 324 or 326 of an adjacent sidewall 303a or 303c. The lengths L for each flange may be different, but are usually the same.

The length L is of a length to provide an overlap of the flanges 310, 312 with the outer sides and sidewalls 202, 203 of the column 200 to enable adequate connection of the beam to the column. A small gap, identified by reference numeral 332, will usually exist between edges 324, 326 of the beam sidewalls 303a, 303c. The size of the gap 332 and the amount of overlap desired will determine the suitable length L. It will be understood that the location of the attachment holes will also play a factor in determining the overall positioning. In one embodiment, regardless of the size of the gap 332, the length L may be approximately equal to or greater than one-half the outer dimension (X or Y, as shown) of the column 200 (or beam).

Figure 3G:
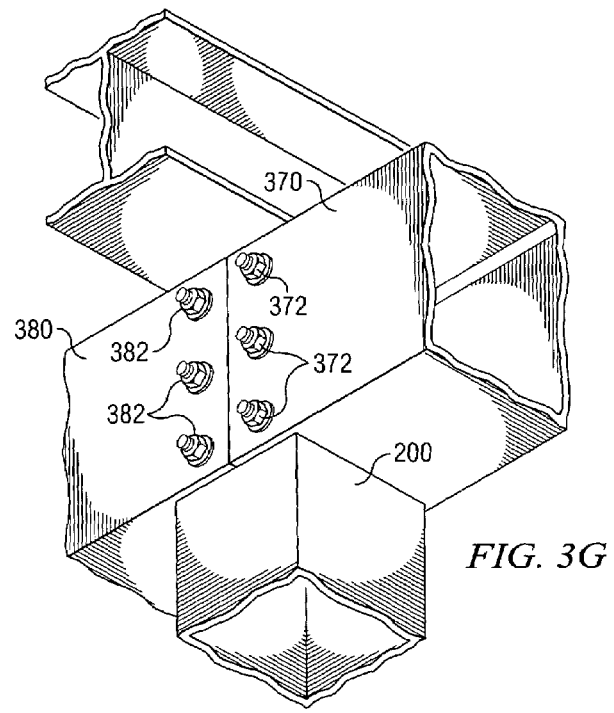
FIG. 3G shows another example of a vertical column and connected first and second beams.

In another specific embodiment, if the beam and column are positioned such that the gap 332 is relatively small, the length L may be approximately equal to one-half the outer dimension (X or Y, as the case may be) of the column/beam to which it will attach/couple, and may be less than one-half the outer dimension. In such case, making the length L of the flanges 310, 312 equal to, or slightly less than the outer dimension of the column 200 allows for an additional beam to be attached/coupled to the column 200 at the same vertical location (or horizontal location, if attached to another beam), thus allowing two beams to be attached to the column 200 at the same height (i.e. in the same horizontal plane or point). An example of this is shown in FIG. 3G. The length L may be longer, if desired. In another embodiment, the length L is substantially equal to or less than one-half the OD of the column 200. In a specific example, if the OD of the column 200 equal 6 inches, the length L is approximately three inches, and may be approximately three and one-eighth inches. This will assist in construction tolerances as there will then be a sufficient gap for clearance.

To assist in providing multiple connection points at the same location on a column 200 (or beam), the attachment holes 208, 308 and the length L of the flanges 310, 312 are configured so that the outer edges of the flanges 310, 312 extend to a point that is about equal to, or less than, about one-half the outer dimension of the column 200 (as shown in FIG. 3F), e.g., extending up to the midpoint. If only one connection is contemplated, then the flanges may extend farther than the mid-point, if desired.

The cross-section dimensions (the X outside diameter and the inner dimension) of the sidewall(s) (that include the flanges 310, 312) along the entire length of the beam 300 are substantially equal to the ID and OD between the two flanges 310 and 312. Moreover, the thickness of the sidewall 303b measured along the length of beam 300 is substantially equal to the thickness of the flange 310, and similarly, the thickness of the sidewall 303d measured along the length of beam 300 is substantially equal to the thickness of the flange 312. Further, the flanges 310 and 312 are integrally formed as part of, and unitary with, the respective sides and sidewalls 302b, 303b and 302d, 303d.

Now referring specifically to FIG. 3F, there is shown a top view of the beam 300 connected to the column 200 (or a side view of a beam connected to another beam). A mechanical fastener 330 extends through the plurality of attachments holes 308 (in the flanges of the beam 300) and attachment holes 208 (in the column 200). Typically, more than one fastener 330 is used.

The overall length of the beam 300 is generally equal to the desired beam span of the structure 100 (with some beams shorter or longer than others, as per the design). In one embodiment, the beam 300 is a single, unitary piece, with lengths ranging from ten to twenty feet. In other embodiments, beam length is between twelve and sixteen feet, greater than twelve feet, and/or up to sixteen feet, and perhaps up to even twenty feet.

Now referring to FIG. 3G, there is shown one example of the vertical column 200 having a first horizontal beam 370 and a second horizontal beam 380 connected. Beams 370, 380 are similar to the beam 300. The first beam 370 is connected at a first location along the column 200 and the second beam 370 is connected at a second location, though at the same vertical height (i.e., both the beams are in the same plane and extend in the same longitudinal direction), along the column 200. Each connection includes a set of attachment holes 372, 382 and plurality of fasteners 330 extending through the respective attachment holes 372, 382 and thus through the respective beam 370, 380 and the column 200. Other configurations are possible, and that shown in FIG. 3G is one example.

When the column 200 and the beam 300 described herein are utilized and connected in the manner provided and designed and constructed appropriately, the connection provides an anchor point that meets or exceeds the United States Occupational Safety and Health Administration (OSHA) anchor requirement of 5000 lbs. As such, utilizing a pultruded FRP 6×6 (inches) column and a pultruded FRP beam having dimension of at least 6×6 (inches) and a beam length of twelve feet or greater (and preferably up to sixteen feet), the present invention provides column spacing distance d of twelve to sixteen feet (and perhaps higher), with the beams spanning this distance d, and the connections of the column-beam provide anchor points that meet or exceed 5000 lbs.

Figure 4A:
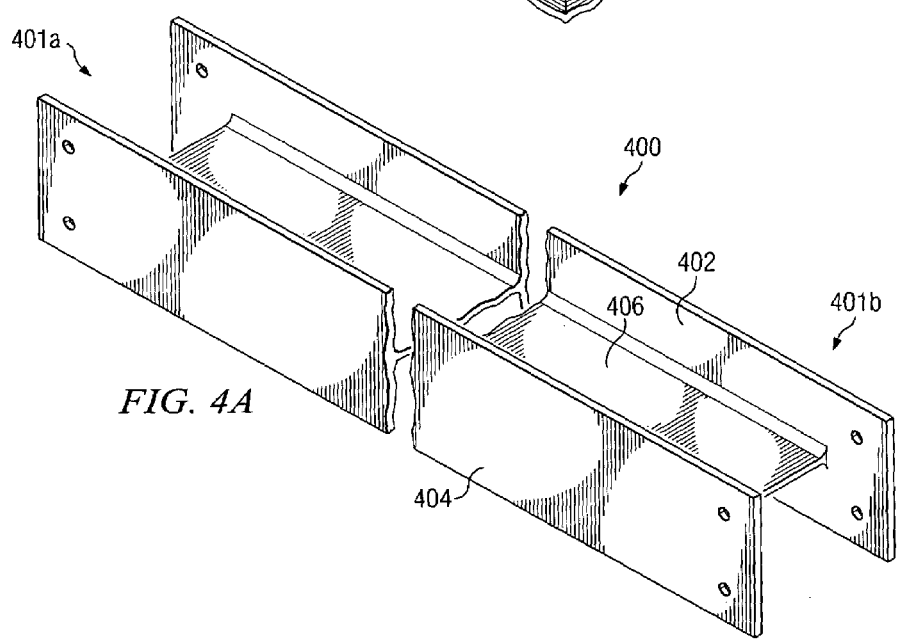
FIGS. 4A, 4B and 4C illustrate a perspective view (FIG. 4A), a detailed perspective view of one end (FIG. 4B), and a cross-sectional view (FIG. 4C) of an alternative embodiment of another beam in accordance with present invention.
Figure 4B:
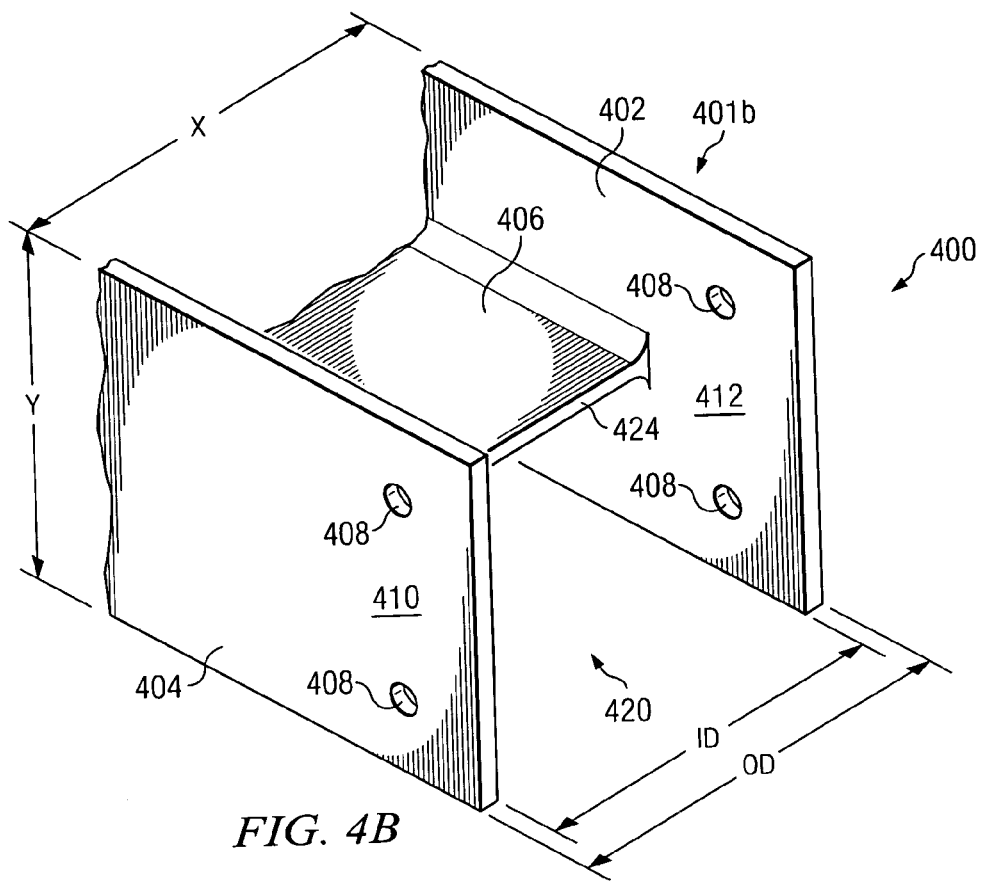
Figure 4C:
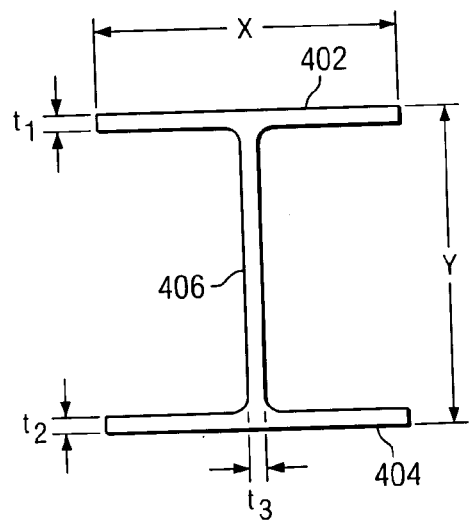

Now referring to FIGS. 4A, 4B and 4C there are shown a perspective view (FIG. 4A), a detailed perspective view of one end (FIG. 4B), and a cross-sectional view (FIG. 4C) of an alternative embodiment of the beam 300, and which is designated using the reference numeral 400, in accordance with present invention. The elongated beam 400 includes a first end 401a and a second end 401b and has generally a rectangular cross-sectional shape, and more particularly an "I" cross-sectional shape. The beam 400 includes a first sidewall 402, a second sidewall 404 and an inner wall 406. The inner wall 406 extends between and connects to the first sidewall 402 and the second sidewall 404. The overall outer dimensions are shown as dimensions X and Y (as shown in FIGS. 4B and 4C).

Now turning specifically to FIG. 4B, one of the ends 401b of the beam 400 is shown. At the end, the first sidewall 402 includes a first connection extension, tab or flange 412, and the second sidewall 404 includes a second connection extension, tab or flange 410. The extensions 410, 412 (similar to the extensions/flanges of the beam 300) extend further outward than the adjacent side of the inner wall 406 thus forming a C-shaped end for the beam 400. The distance between the inner wall of the flange 410 and the flange 412 is (similar to that described with respect to the beam 300) the inner dimension (ID) while the distance between the outer walls is the outer dimension (OD). In one specific embodiment, the beam 400 is formed with a flush end (i.e., the walls 402, 404, 406 extend the same length), and material from the areas 420 (part of the inner wall 406) is cut out or removed to form the C-shaped end, thus resulting in the formation of the extensions or flanges 410, 412.

Similar to the extensions or flanges 310, 312, the connection extensions or flanges 410, 412 provide, in essence, an integrally formed connection or mounting plate (integrally formed, as well as unitary, with the rest of the beam 400) and operable to be positioned adjacent to the sidewalls of the column 200 and mounted to the outsides of the column 200. Each of the connection extensions or flanges 410, 412 similarly provide an area that is positioned adjacent a sidewall area of the column 200.

The connection extensions 410 and 412 each include one or more attachment holes or apertures 408 and are similar to the attachment holes 308.

As illustrated in FIGS. 4B and 4C, the cross-section of the beam 400 is I-shaped (the beam 400 may include additional inner walls for additional strength, if desired). The sidewall 402 has a thickness t1, the sidewall 404 has a thickness t2 and the inner wall has a thickness t3. In one embodiment, the thickness t is substantially the same for all sidewalls (t1 equals t2 equals t3). In other embodiments, the respective thickness may vary.

The dimensions X and Y may be chosen as desired. In one specific embodiment shown in FIG. 4C, the approximate dimensions are: X=6 inches, Y=6.62 inches, t1=t2=t3=0.25 inch, resulting in the inner dimension (ID) between the flanges of approximately ID=6.12 inch (such beam is referred to by the inventors as a "casing beam"). As will be appreciated, other X and Y dimensions and thickness t1, t2 and t3 may be used, as desired. In another embodiment, both X and Y are at least four inches or greater. Dimensions X and/or Y reflect the outside dimension (OD) of a given cross-section, as the case may be, of the beam 400.

As described above with respect to beams 300, one aspect of the present invention is to have the inner dimension (ID) (cross-section) between the flanges 410 and 412 of the beam 400 to be substantially equal to (or slightly larger, given construction requirements and tolerances) the outer dimension (X or Y) of the column 200.

Now referring to FIGS. 3E and 3F, though these figures are described and include reference numerals relating to the beam 300, these figures may also be referenced to show a top/side view of one end 401b of the beam 400 prior to connection to the column 200 and a top/side view after connection. As such, FIGS. 3E and 3F (and description herein) are similarly applicable to describe the functioning and attributes of the beam 400. The beam 400 is a specific embodiment (I-shaped versus rectangular shaped) of the beam 400. As such, reference is made to the description above, and the corresponding/similar parts of the beam 400 have the same or similar description, attributes, and functionality, as those parts of the beam 300 shown in the FIGURES.

Figure 4D:
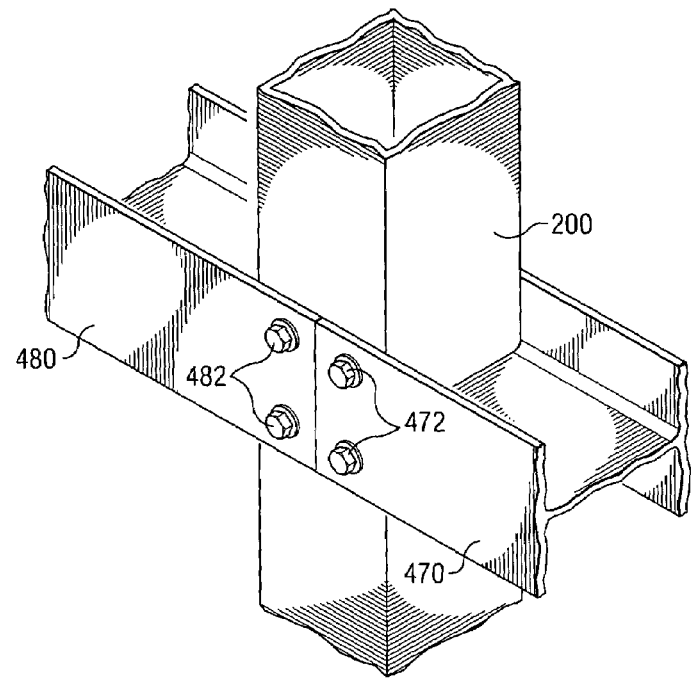
FIG. 4D shows one example of a vertical column and connected first and second beams of the alternative embodiment shown in FIGS. 4A, 4B and 4C.

Now referring to FIG. 4D, there is shown one example of the vertical column 200 having a first horizontal beam 470 and a second horizontal beam 480 connected. Beams 470, 480 are similar to the beam 400. The first beam 470 is connected at a first location along the column 200 and the second beam 470 is connected at a second location, though at the same vertical height (i.e., both the beams are in the same plane and extend in the same longitudinal direction), along the column 200. Each connection includes a set of attachment holes 472, 482 and plurality of fasteners 330 extending through the respective attachment holes 472, 482 and thus through the respective beam 470, 480 and the column 200. Other configurations are possible, and that shown in FIG. 4D is one example.

It should be noted that though the FIGURES and description generally describe columns and beams, and illustrate column-beam connections, the present invention contemplates connection of beams (beams 300, 400) to other beams.

Though not shown, the ends of the beams 300, 400 may be cut diagonal to allow for diagonal attachment to a column (or other beam). As such, the beams may also function as diagonal bracing members for bracing between columns. In particular, a beam such as the beam 400 may be particularly useful for such application.

When constructed using fiber reinforced plastic (FRP), each of the columns 200 and beams 300, 400 are unitary and integrally formed. Further, the beams 300, 400 may be utilized as beams to carry joists, or as joists themselves. Further the beams may be utilized to carry loads and may be used for other or additional purposes, such as for attachment means for outer casing materials, etc.

In a specific embodiment, the column 200 and the beam 300, 400 are made of a material containing glass fiber, or other composite or reinforcing material (s). The column 200 is made of pultruded fiber reinforced plastic (FRP) and may include some fire resistant and/or non-fire resistant materials, as will be understood by those in the art. In one embodiment, the columns and beams (and other plastic structures described herein) are constructed using brominated resin for fire retardant characteristics. Pultruded FRP structures or members are generally those produced by pulling glass fibers or mats (or other composite or reinforcing material) through a die with a resin material. Any reinforcing fiber or other materials may be used, and any type of resin material, such as polyurethane, vinylester, polyester, or other polymer materials may be used, as known to those in the art. In one embodiment, the plastic structures include carbon to increase strength, and in another embodiment, the reinforcing fiber may be defined as carbon material or other strength increasing materials.

The columns 200 and beams 300, 400 are manufactured using a typical pultrusion process (resin bath, die injection, etc.) using dies corresponding to the desired cross-sectional shape of the column or beam. As the pultruded component (column, beam, etc.) is pulled through the die and solidifies, the component is cut to length per the desired lengths, as specified herein (the components may also be cut to a standard length, and then re-cut to the needed length at a later time). Each column 200 and beam 300, 400 is integrally formed, and of unitary construction. After the columns or beams are made to the appropriate length, attachment holes are formed (as previously described herein) at the suitable locations and the end(s) of the beams are formed to create the connection extensions or flanges (as described). The system of the present invention allows for the custom design of a tower/structure 10 with components that are specially constructed that allows for quick and efficient erection of the structure at the desired site. Though a pultrusion process is disclosed, it may be possible to utilize another manufacturing process to create the composite plastic structures.

Figure 5A:
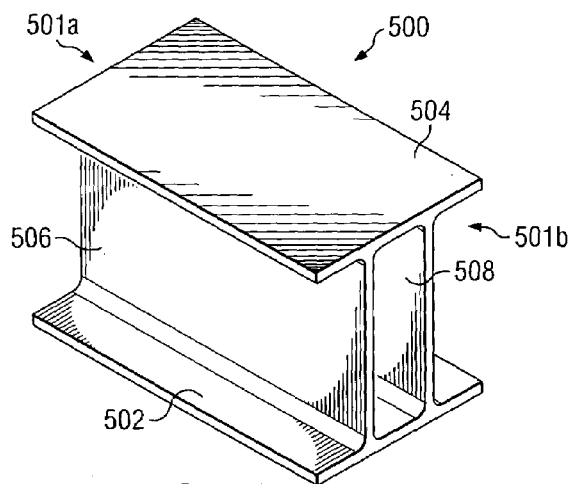
FIGS. 5A and 5B illustrate a perspective view (FIG. 5A) and a cross-sectional view (FIG. 5B) of a joist beam 500 in accordance with present invention.
Figure 5B:
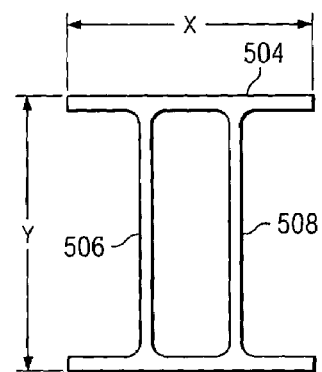

Now referring to FIGS. 5A and 5B, there are shown a perspective view (FIG. 5A) and a cross-sectional view (FIG. 5B) of a joist beam 500 in accordance with present invention. The elongated joist beam 400 includes a first end 501a and a second end 501b and has generally a double "I" cross-sectional shape. The joist 500 includes a first sidewall 502, a second sidewall 504, a first inner wall 506 and a second inner wall 508. Each of the inner walls 506, 508 extends between and connects to the first sidewall 502 and the second sidewall 504. The overall outer dimensions are shown as dimensions X and Y (as shown in FIG. 5B).

As illustrated in FIG. 5B, the cross-section of the joist 500 is double I-shaped (the joist 500 may include additional inner walls for additional strength, if desired). The sidewall 502, the sidewall 504, the first inner wall 506 and the second inner wall 508 each have at thickness, t1, t2, t3, t4, respectively (not shown). In one embodiment, the thickness t is substantially the same for all members. In other embodiments, the respective thickness may vary.

The dimensions X and Y may be chosen as desired. In one specific embodiment shown in FIG. 5B, the approximate dimensions are: X=4 inches, Y=6 inches, t1=t2=0.25 inch, and t3=t4=0.15 inch (such joist is referred to by the inventors as a "heavy joist", while "lighter" joists may also be utilized, all depending on the load). As will be appreciated, other X and Y dimensions and thickness t1, t2 and t3 may be used, as desired. In another embodiment, both X and Y are at least three inches or greater. Dimensions X and/or Y reflect the outside dimension (OD) of a given cross-section, as the case may be, of the joist 500.

The joist 500 is similarly constructed and made using a pultrusion process as the beams and columns. The joist 500 is integrally formed, and of unitary construction. The joists may additionally be constructed with polyurethane and stronger reinforcement materials, to increase the strength and load carrying capabilities of the joist 500. Joists of the type typically span more than one bay.

As such, the overall length of the beam 500 is generally equal to the desired joist span, or partial span, of the structure 100 (with some joists shorter or longer than others, as per the design). In one embodiment, the beam 500 is a single, unitary piece, with lengths ranging from ten to fifty feet. In other embodiments, joist length is between fourteen and forty feet, greater than twenty feet, and/or greater than twenty-five feet.

Figure 6A:
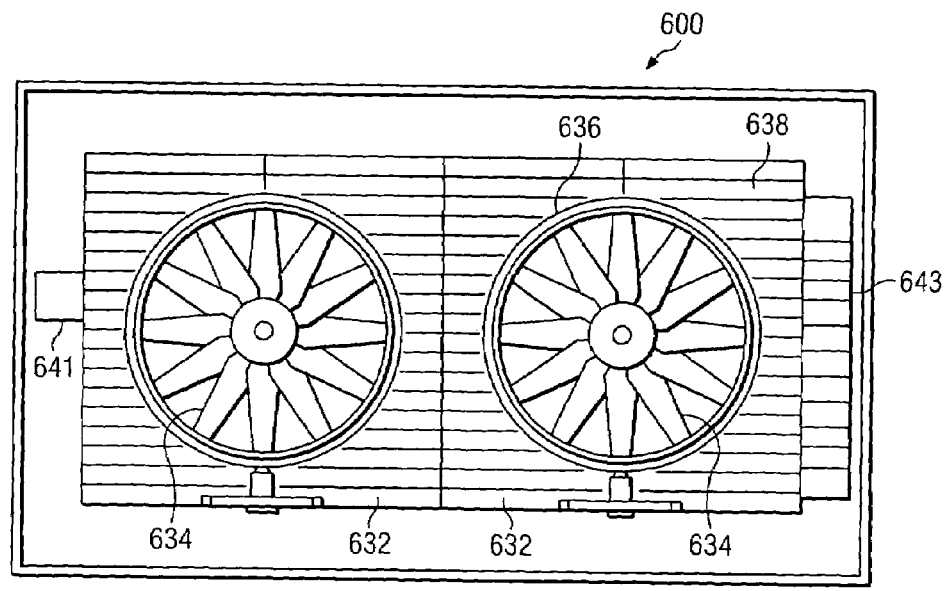
FIGS. 6A, 6B, and 6C illustrate various views of a cooling tower in accordance with the present invention, and which incorporates the structure 100 and various components of the present invention.
Figure 6B:
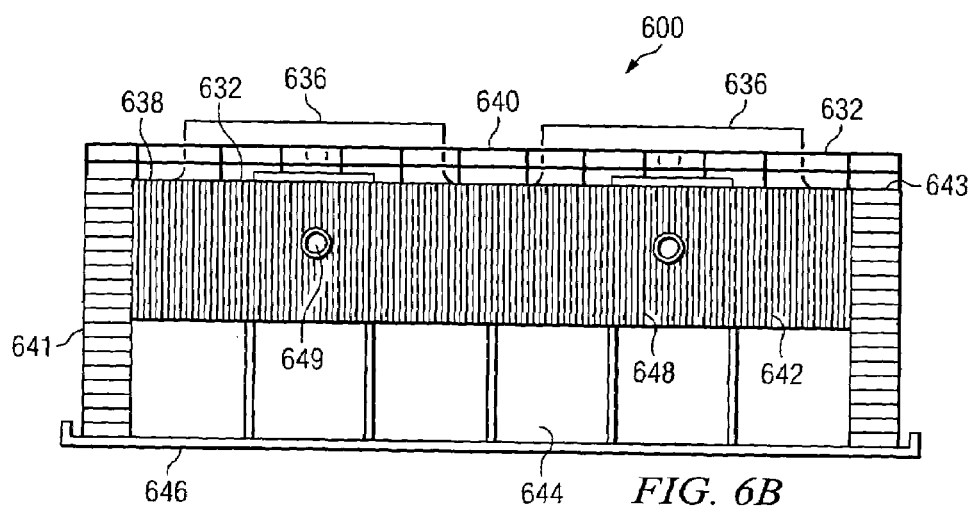
Figure 6C:
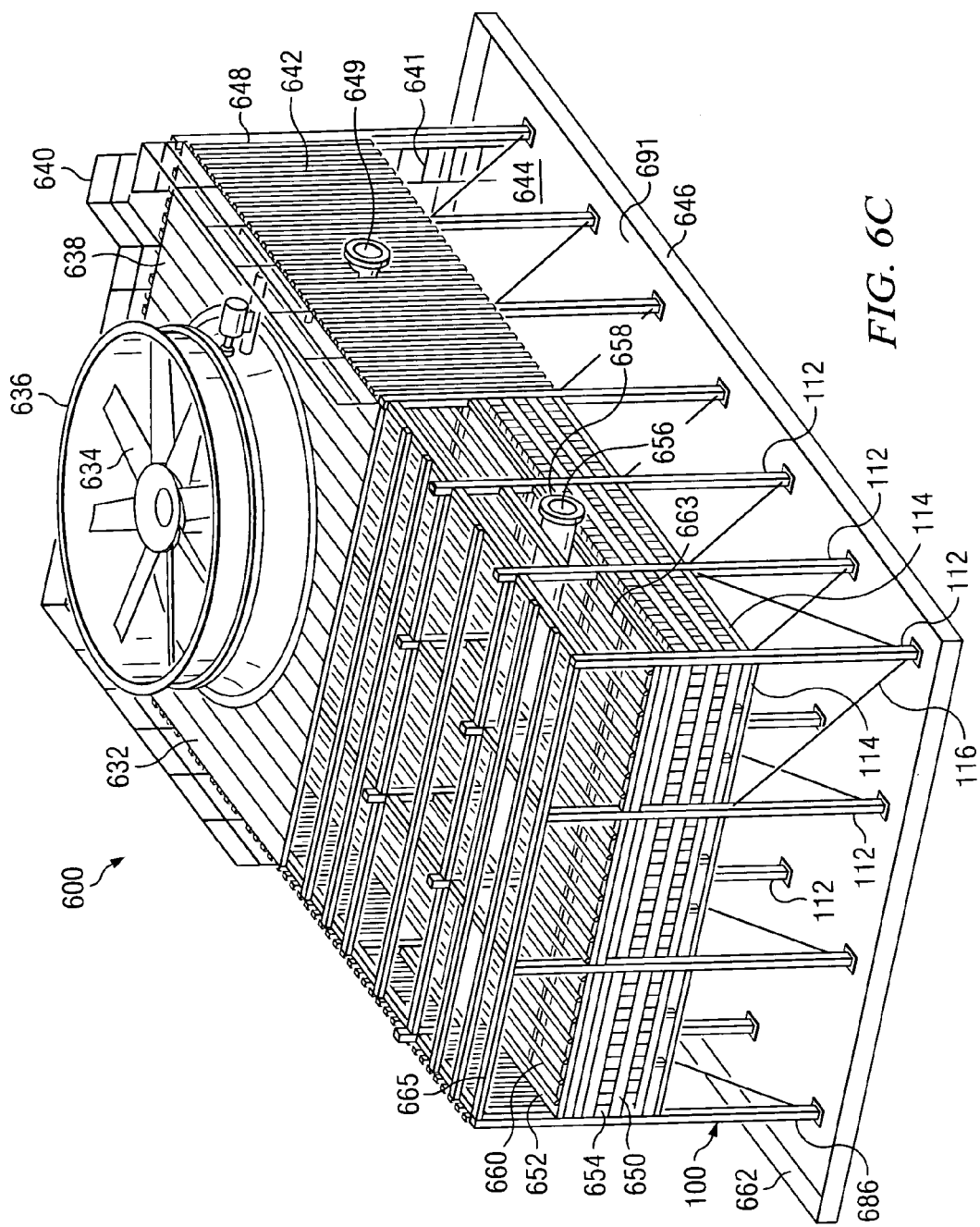

Now referring to FIGS. 6A, 6B, and 6C, there is illustrated various views of a cooling tower 600 in accordance with the present invention, and that incorporates the structure 100 and various components described herein. It will be understood that the cooling tower 600 and the structures shown throughout the remainder of the figures and described herein represent examples of the present invention, and the invention is not limited to the structures shown and described.

The cooling tower, generally designated by reference numeral 600 is shown with two cells 632. Each cell 632 is shown as a square about forty-two feet on each side, so its overall footprint is about forty-two by eighty-four feet. Each cell 632 is shown with nine (3×3) bays, with each bay about fourteen by fourteen feet. Other configurations are contemplated, including a single cell or multiple cells, with each cell having any number of bays (e.g., 2×2, 3×3, or uneven combinations). Each cell 632 includes a fan 634 held within a fan shroud 636 that may generally be formed of a fiber reinforced plastic structure that is assembled on top of the cooling tower 600. The fan 634 sits atop a geared fan-speed reducer which itself receives a drive shaft extending from a fan motor. The fan, fan speed reducer and motor may be mounted as conventional in the art, as for example, mounting on a beam such as a steel tube or pipe of appropriately chosen structural characteristics such as bending and shear strength and torsion resistance, or the equipment may be mounted on a beam or joist constructed of FRP. The motor and beam may be located on the roof or top of the cooling tower 600 or within it. In the illustrated embodiment, the fan shroud 636 is mounted on top of a flat deck 638 on top of the cooling tower 600 with a guard rail 640 around the perimeter. A ladder 641 or stairway 643 may also be provided for access to the deck, and walkways may also be provided on the deck.

Beneath the deck 638 are the upper levels 642 (122 in FIG. 1A) of the cooling tower 600 and beneath the upper levels 642 is the bottom or air intake level 644 (120 in FIG. 1A). Beneath the air intake level 644 is a means or mechanism for collecting cooled water from the fill system. In the illustrated embodiment, the collecting means or mechanism is a basin 646, into which cooled water drips and is collected.

The exterior of the upper levels 642 may be covered with a casing or cladding 648 designed to allow air to pass through into the cooling tower during, for example, windy conditions, and may be designed to be sacrificial, that is, to blow off when design loads are exceeded. The casing 648 may be made of fiber reinforced plastic or some other material and may comprise louvers.

As shown in FIG. 6C, the upper levels 642 include a fill level 650 and water distribution level 652. The fill level 650 is below the water distribution level 652, so that water is distributed to drip through the fill level 650 to the collecting basin 646 below. Air is moved through the fill level 650 past the water to cool it. The illustrated fan 634 comprises one possible means for causing air to move through the fill system, although other means or mechanisms may b used, such as a blower n a cross-flow arrangement.

As known in the art, the fill level 650 is filled with fill material 654 that provides a heat transfer function and media. Generally, the fill is open-celled material that allows water to pass downwardly and air to pass upwardly, with heat transfer taking place between the water and air as they pass. Open-celled clay tile or polyvinyl chloride materials or other open cell heat transfer media may be used. Various types of fill material may be used, and such fill material is commercially available. The cooling tower 600 of the present invention is not limited to use of any particular type of fill material. The present invention is also applicable to cross-flow designs.

A water distribution system 649 in the water distribution level 652 above the fill level 650 includes a distribution header 656 that receives hot water from a supply pipe (not shown) that may be connected to the inlet 658 on the exterior of the cooling tower. One distribution header 656 extends across the width of each cell, and each is connected to a plurality of lateral distribution pipes 660 extending perpendicularly from the header 656 to the opposite edges of each cell. The lateral distribution pipes 660 are spaced evenly across each bay, with lateral distribution pipes being provided in each of the fourteen by fourteen foot bays of the illustrated embodiment. Larger or smaller bays may be provided with an appropriate number and spacing of water distribution pipes provided.

Each lateral distribution pipe 660 has a plurality of downwardly directed spray nozzles 663 connected to receive hot water and spray it downward in drops onto the fill material 654, where heat exchange occurs as gravity draws the water drops down to the basin and the fan draws cool air up through the cooling tower. Each lateral distribution pipe may have, for example, ten nozzles, so there may exist eighty nozzles in each bay 662. The water distribution system 649 is shown and described for purposes of illustration only and other designs may also be utilized.

The cooling tower of the present invention also has a tower/frame structure 100 (also refer to FIG. 1A) to support the fan system, water distribution system and fill material. The structure 100 defines an interior volume 665 within which the fill material and substantial portion of the water distribution system are contained. The frame or structure 100 includes a plurality of vertical columns 112 and horizontal beams 114, as described previously. The horizontal beams 114 are attached to the columns 112 in a novel manner, as described herein to provide a rigid frame/structure with bays larger than the prior art and/or with fewer connections and/or components, thus simplifying construction and lowering the cost of building the field erected frame/structure 100, and ultimately the cooling tower 600 tower.

The cooling tower 600 further includes the collecting basin 646 that defines a base 691 on which the vertical columns 112 are mounted through footings 686. The types of footings and connections available are generally known to those in the art.

The cooling tower 600 generally includes the structure 100 (and components) generally shown in FIG. 1A.

As such, the frame/structure 100 includes a plurality of interconnected columns, beams and joists that provides a supporting structure for the other components of the cooling tower 600. Additional components and/or more detailed descriptions of these components in the cooling tower 600 are described in U.S. Pat. No. 5,902,522, which is incorporated herein by reference.

Now referring to FIGS. 7A, 7B, 7C and 7D, there are shown a perspective view (FIG. 7A) and a cross-sectional view (FIG. 7B) of a toe board and top trim member 700 (referred hereinafter as "toe/trim member") in accordance with present invention. The elongated toe/trim member 700 includes a first end 701a and a second end 701b and has generally a "+" cross-sectional shape (or four-prong star shape). The toe/trim member 700 includes a first wall 702, a second wall 704, a first L-shaped wall 706, and a second L-shaped wall 708. The first L-shaped wall 706 includes a first portion 706a and a second portion 706b. Similarly, the second L-shaped wall 708 includes a first portion 708a and a second portion 708b. Each wall 702, 704, 706, 708 extends radially from an axis point (or member) or connection point (or member) 710 extending longitudinal along a length of the toe/trim member 700. This length may be a portion, the entire length or substantially the entire length. The walls 702, 704, 706, 708 may also be described as laterally extending transversely from the member 710. The member 710 may be referred to as a central or main member. In the embodiment shown, all walls connect to each other at the point/area (or member) 710 (a single point/area/member of connection for all the walls is not necessary, though desirable).

As illustrated, the first wall 702 extends opposite the second L-shaped wall 708, while the second wall 704 extends opposite the first L-shaped wall 706. Each of the walls extends at approximately right angles from an adjacent wall, including the second portions 706b, 708b extending from the respective first portions 706a, 708b. The overall outer dimensions are shown as dimensions X and Y (as shown in FIG. 7B). The dimension C illustrates the distance between the wall 702 and an outer member 706a of the first L-shaped wall 706. As will be appreciated, the area defined between the first wall 702 and the L-shaped wall 706 will carry or receive an edge of casing or cladding material or panels (shown in FIG. 7D). The dimension C is approximately equal to the thickness of the cladding or casing panels. Each of the walls 702, 704, 706 and 708 has a thickness, t1, t2, t3, t4, respectively (not shown). In one embodiment, the thickness t is substantially the same for all members. In other embodiments, each respective thickness may vary.

The dimensions X and Y may be chosen as desired. In one specific embodiment shown in FIG. 7B, the approximate dimensions are: X=3.6 inches, Y=6 inches, t1=t2=t3=t4=0.2 inch. As will be appreciated, other X, Y and C dimensions and thickness t may be used, as desired. In another embodiment, both X and Y are at least three inches or greater.

The toe/trim member 700 is similarly constructed (as the columns, beams and joists) and may be made using a pultrusion process. The member 700 is integrally formed, and of unitary construction. The length of the toe-trim member 700 can be any desired length, and is chosen to span between two or more outer columns 112 of the structure 100, or as needed. In one embodiment, the toe/trim member 700 is a single, unitary piece, with lengths ranging from ten to sixty feet, and in one embodiment, is equal to or greater than the column spacing.

Figure 7A:
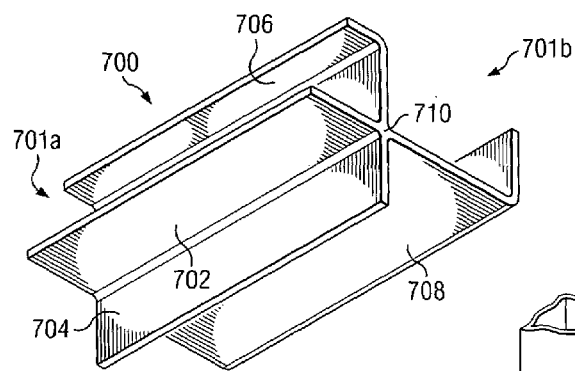
FIGS. 7A and 7B illustrate a perspective view (FIG. 7A) and a cross-sectional view (FIG. 7B) of a toe board and top trim member in accordance with present invention.
Figure 7C:
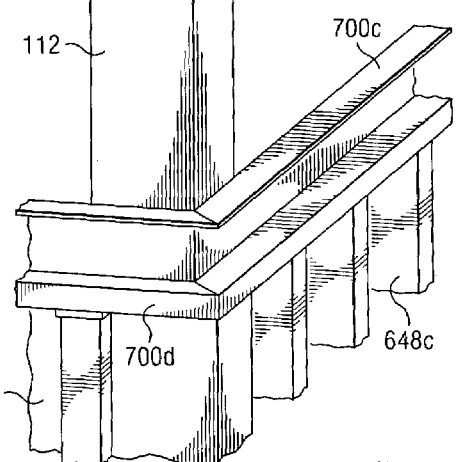
FIGS. 7C and 7D illustrate a perspective view (FIG. 7C) of a corner column with two attached toe/trim members (illustrating members being used as top trim) and a cut-away side view (FIG. 7D) of a corner column with two attached toe/trim members (illustrating members being used as a toe board), all in accordance with present invention.
Figure 7B:
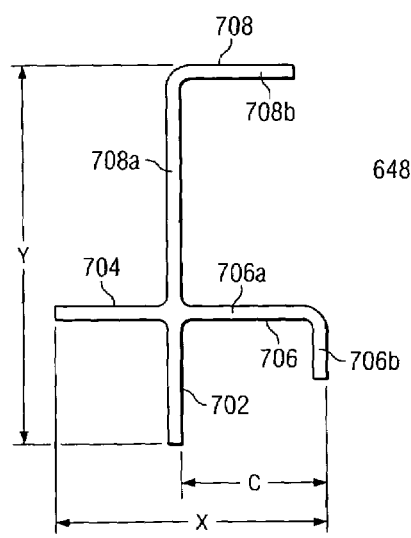
Figure 7D:
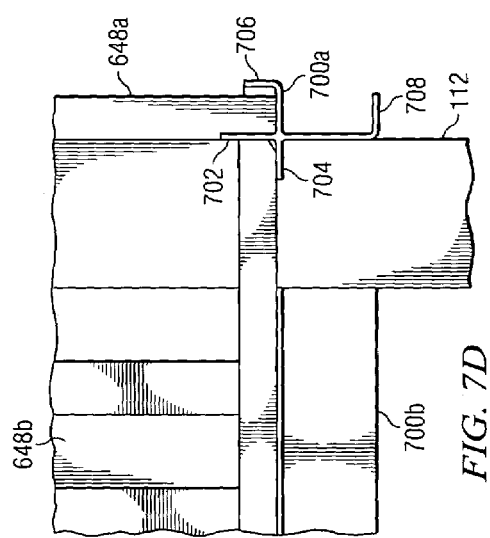

Now referring to FIGS. 7C and 7D, there are shown a perspective view (FIG. 7C) of a corner column 112 with two attached toe/trim members 700c, 700d (illustrating the top/trim members being used as top trim) and a cut-away side view (FIG. 7D) of a corner column 112 with two attached toe/trim members 700a, 700b (illustrating the top/trim members being used as a toe board) in accordance with present invention.

As illustrated, the wall 702 and a portion of the second L-shaped wall 708 form attachment or mounting plates for mounting to an outer wall of the column 112 (one or both may be used for attaching). The wall 702 and/or second portion 706b (of wall 706) may also provide attachment locations for the casing panels 648. Any fastening or attachment means (not shown) and methods may be utilized, such as bolts, screws, bonding, etc., and the like. When used as a trim member (FIG. 7C) the wall 702 and wall 706 of the respective member 700c, 700d function to receive and stabilize the casing or cladding panels 648c, 648d. When used as a toe board (FIG. 7D) the wall 702 and wall 706 of the respective member 700a, 700b function to receive, stabilize and support the casing or cladding panels 648a, 648b.

The corrugated nature of standard casing panels 648 allows air leakage at the bottoms and tops of the panels, which is undesirable. As such, the toe/trim member 700 of the present invention provides a single and unitary building component that provides several functions: reduces or eliminates the undesirable air flow, supports and stabilizes the casing panels, and provides a source of attachment for the casing panels.

It will be understood that a portion of the wall 704 will be removed (cut-away) at the locations where the toe/board member abuts the column 112 (or other beam or column or structure, as needed) for mounting/attachment. As will be appreciated, the wall 704 of the toe-trim member 700 may be optional, however, it increases the strength of the overall toe/board member 700.

Figure 8:
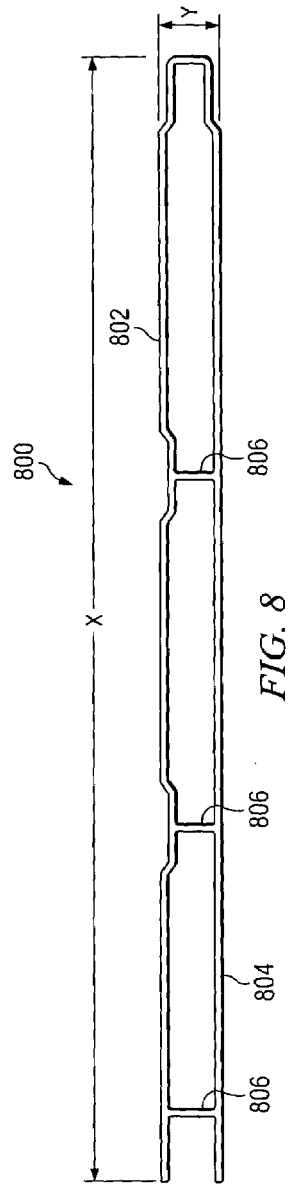
FIG. 8 illustrates a cross-sectional view (FIG. 7A) of a double wall panel member in accordance with present invention.

Now referring to FIG. 8, there is illustrated a cross-section of a double wall panel member 800. The panel 800 includes a first wall 802 and a second wall 804, with the walls 802, 804 spaced laterally from each other. Each wall 802, 804 has an outer surface and an inner surface. One or more inner walls 806 interconnect the first wall 802 and the second wall 804, as shown, to couple the walls 802, 804 together. The ends may be configured to interconnect to provide a mechanism to couple two panels 800 together, as shown in FIG. 8.

The dimension X and Y may be chosen as desired, however, in the embodiment shown, X is between two and five feet, and Y is equal to or greater than about 1 inch. In another embodiment, Y is between about ¾ and 2 inches. Each of the walls 802, 804, 806 has a thickness, t1, t2, and t3, respectively (not shown). In one embodiment, the thickness t is substantially the same for all members. In other embodiments, each respective thickness may vary.

The double wall panel 800 (or member) is similarly constructed (as the columns, beams, joist) and may be made using a pultrusion process. In another embodiment, the panel 800 includes a fire retardant material, such as brominated resin. The panel 800 is integrally formed, and of unitary construction. The length of the panel 800 can be any desired length, and is chosen to span between two or more columns 112 of the structure 100, or as needed. In one embodiment, the double wall panel 800 is a single, unitary piece, with lengths ranging from ten to sixty feet, and in one embodiment, is equal to or greater than the column spacing.

Multiple double panel walls 800 are utilized to form a firewall (as described below) between individual adjacent cells 632. In the event of a fire in one cell, the firewall advantageously prevents (or reduces the potential of) the fire from spreading to an adjacent cell. In some applications, it is desirable that each cooling cell (within a cooling tower structure having multiple cells) operate independently of each other. Thus, to reduce the risk that a fire in one cell will spread to another cell, prior art cooling towers incorporated an expensive fire sprinkler system into the structure. However, when a firewall structure is utilized that meets certain insurance industry (or other industry) guidelines or tests, the need for such a sprinkler system may be eliminated. Accordingly, the present invention provides a firewall structure, when constructed between cells, that increases fire resistance between cells and may reduce or eliminate the need for a fire sprinkler system.

Now referring to FIG. 9A, there is shown a first embodiment of a firewall 900a in accordance with the present invention. A cooling tower (such as tower 600 in FIGS. 6A-6C) includes one or more columns 902 (similar to columns 112 in FIG. 1A) delineating between two adjacent cooling cells 632 (Cell 1 and Cell 2). Beams 904 and 906 are shown for illustration purposes only.

A first wall 910 is positioned adjacent to a first side of the column 902, while a second wall 912 is positioned adjacent to a second side of the column 902. The first wall 910 and the second wall 912 are spaced apart by a distance A, as shown in FIG. 9A. Each of the first and second walls 910, 912 extends vertically and horizontally substantially the entire area between the two cells 632 (i.e., the cross-sectional area between the two cells). The first wall 910 includes one or more double panel walls 800 (described previously) to form the wall 910. Similarly, the second wall 912 includes one or more double panel walls 800 (described previously) to form the wall 912. The double panel walls 800 are attached to the column 902. Optionally, one or more spacers 914, 916 may be used, that space the walls 910, 912 from the column 902 (e.g., ½ to 1 inch, or greater). The spacers 914, 916 may also be constructed of plastic material, such as fiber-reinforced composite material with fire retardant material.

In the embodiment shown in FIG. 9A, the column 902 is positioned between the first wall 910 and the second wall 912 and by design provides a space (spacing) between the double wall panels of the first and second walls 910, 912, respectively. In one embodiment, the dimension A (spacing between the first and second walls 910, 912) is at least equal to the width of the column 902. In other embodiments, the spacing may be about one inch or greater, may be three inches or greater, or may be six inches or greater.

Now referring to FIG. 9B, there is shown a second embodiment of a firewall 900b in accordance with the present invention. Beams 904 and 906 are shown for illustration purposes only.

A first wall 910a is positioned adjacent to a first side of the column 902, while a second wall 912a is positioned adjacent the first wall 910a. The first wall 910a and the second wall 912a are spaced apart by a distance A, as shown in FIG. 9B. Each of the first and second walls 910, 912 extends vertically and horizontally in an amount substantially equal to the cross sectional area between the two cells 632. The first wall 910a includes one or more double panel walls 800 (described previously) to form the wall 910a. Similarly, the second wall 912a includes one or more double panel walls 800 (described previously) to form the wall 912a. The double panel walls 800 are attached to the column 902 (directly or indirectly). Optionally, a spacer 914 may be used to space the first wall 910a from the column 902 (e.g., ½ to 1 inch, or greater). A second spacer 920 may be placed between the first wall 910a and the second wall 912a to provide a gap (for air, or for the addition of other fire resistant material or members) between the walls. The spacers 914, 920 may also be constructed of plastic material, such as fiber-reinforced composite material with fire retardant material.

As will be appreciated, utilizing double wall panels 800 for each of the two coplanar firewalls 910, 912, and spacing the walls 910, 912 a predetermined distance A from each other increases the fire resistance characteristics of the firewalls 900a, 900b, as opposed to using only a single wall.

It will be understood that the firewall system as described herein is not limited to use in cooling tower structures, but may be used in other structures or installations where it is desirable to contain one portion or area (e.g. cell) from another for fire containment or resistance purposes.

It may be advantageous to set forth definitions of certain words and phrases that may be used within this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "couple" or "connect" refers to any direct or indirect connection between two or more components, unless specifically noted that a direct coupling or direct connection is present.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A support structure comprising:
an elongated column having a rectangular cross-sectional shape, comprising,
   a first side having an outer surface, a second side having an outer surface, a third side and a fourth side, and
   at least one aperture extending through the column and through the first side and the second side of the column;
an elongated beam comprising,
   a first end and a second end,
   a first side and a second side with each side extending between the first end and the second end,
   a first flange having a first aperture and extending outward from the first end of the beam and integrally formed as a portion of the first side, the first flange positioned adjacent the outer surface of the first side of the column such that the first aperture aligns with the aperture of the column,
   a second flange having a second aperture and extending outward from the first end of the beam and integrally formed as a portion of the second side, the second flange positioned adjacent the outer surface of the second side of the column such that the second aperture aligns with the aperture of the column;
a fastener extending through each of the first aperture, the second aperture and the aperture in the column, operable for coupling the beam to the column; and
wherein the first and second flanges extend no further than the mid-point of the outer surface of the first side and the mid-point of the outer surface of the second side of the column.

2. The structure in accordance with claim 1 wherein an inner wall of the first flange and an inner wall of the second flange are separated by a distance a, and the outer surface of the first side of the column and the outer surface of the second side of the column are separated by a distance b, and the distance a substantially equal to or greater than the distance b.

3. The structure in accordance with claim 2 wherein the beam is a single unitary piece formed of pultruded composite fiber-reinforced plastic.

4. The structure in accordance with claim 3 wherein the beam has an I-shaped cross-section.

5. The structure in accordance with claim 3 wherein the beam has a rectangular cross-sectional shape.

6. The structure in accordance with claim 5 wherein the beam has four sides.

7. A support structure comprising:
an elongated column having a rectangular cross-sectional shape, comprising,
   a first side having an outer surface, a second side having an outer surface, a third side and a fourth side, and
   at least one aperture extending through the column and through the first side and the second side of the column;
an elongated beam comprising,
   a first end and a second end,
   a first side and a second side with each side extending between the first end and the second end,
   a first flange having a first aperture and extending outward from the first end of the beam and integrally formed as a portion of the first side, the first flange positioned adjacent the outer surface of the first side of the column such that the first aperture aligns with the aperture of the column,
   a second flange having a second aperture and extending outward from the first end of the beam and integrally formed as a portion of the second side, the second flange positioned adjacent the outer surface of the second side of the column such that the second aperture aligns with the aperture of the column;
a fastener extending through each of the first aperture, the second aperture and the aperture in the column, operable for coupling the beam to the column; and
wherein the first and second flanges extend along the outer surfaces of the column no further than a centerline of the column.

8. A support structure comprising:
an elongated column having a rectangular cross-sectional shape, comprising,
   a first side having an outer surface, a second side having an outer surface, a third side and a fourth side, and
   at least one aperture extending through the column and through the first side and the second side of the column;
an elongated beam comprising,
   a first end and a second end,
   a first side and a second side with each side extending between the first end and the second end,
   a first flange having a first aperture and extending outward from the first end of the beam and integrally formed as a portion of the first side, the first flange positioned adjacent the outer surface of the first side of the column such that the first aperture aligns with the aperture of the column,
   a second flange having a second aperture and extending outward from the first end of the beam and integrally formed as a portion of the second side, the second flange positioned adjacent the outer surface of the second side of the column such that the second aperture aligns with the aperture of the column;
a fastener extending through each of the first aperture, the second aperture and the aperture in the column, operable for coupling the beam to the column; and
wherein the fastener is positioned at a location that is nearer to the third side of the column than the fourth side of the column.

9. The structure in accordance with claim 3 wherein the first and second flanges are positioned at the first end of the beam, and the second end of the beam further comprises:

a third flange extending outward from the first side of the beam and integrally formed as a portion of the first side; and a fourth flange and extending outward from the second side of the beam and integrally formed as a portion of the second side, and wherein the third and fourth flanges are operable for connecting to respective sides of another column.

10. A method of constructing a support structure, the method comprising:

providing an elongated column having a rectangular cross-sectional shape, the column having a first side having an outer surface, a second side having an outer surface, a third side and a fourth side, and at least one aperture extending through the column and through the first side and the second side of the column;

providing an elongated beam having a first end and a second end, a first side and a second side with each side extending between the first end and the second end, a first flange having a first aperture and extending outward from the first side of the beam and integrally formed as a portion of the first side, and a second flange having a second aperture and extending outward from the second side of the beam and integrally formed as a portion of the second side;

positioning the first flange adjacent the outer surface of the first side of the column such that the first aperture aligns with the aperture of the column;

positioning the second flange adjacent the outer surface of the second side of the column such that the second aperture aligns with the aperture of the column;

extending a fastener through each of the first aperture, the second aperture and the aperture in the column to couple the beam to the column; and positioning the first and second flanges to extend no further than the mid-point of the outer surface of the first side and the mid-point of the outer surface of the second side of the column.

11. The method in accordance with claim 10 wherein an inner wall of the first flange and an inner wall of the second flange are separated by a distance a, and the outer surface of the first side of the column and the outer surface of the second side of the column are separated by a distance b, and the distance a substantially equal to or greater than the distance b.

12. The method in accordance with claim 11 wherein the beam is a single unitary piece formed of pultruded composite fiber-reinforced plastic.

13. The method in accordance with claim 12 wherein the column is a single unitary piece formed of pultruded composite fiber-reinforced plastic.

14. A method of constructing a support structure, the method comprising:

providing an elongated column having a rectangular cross-sectional shape, the column having a first side having an outer surface, a second side having an outer surface, a third side and a fourth side, and at least one aperture extending through the column and through the first side and the second side of the column;

providing an elongated beam having a first end and a second end, a first side and a second side with each side extending between the first end and the second end, a first flange having a first aperture and extending outward from the first side of the beam and integrally formed as a portion of the first side, and a second flange having a second aperture and extending outward from the second side of the beam and integrally formed as a portion of the second side;

positioning the first flange adjacent the outer surface of the first side of the column such that the first aperture aligns with the aperture of the column;

positioning the second flange adjacent the outer surface of the second side of the column such that the second aperture aligns with the aperture of the column;

extending a fastener through each of the first aperture, the second aperture and the aperture in the column to couple the beam to the column, and positioning the fastener at a location that is nearer to the third side of the column than the fourth side of the column.

15. The method in accordance with claim 10 wherein providing the beam further comprises providing the beam having a second end, the second end having a third flange extending outward from the first side of the beam and integrally formed as a portion of the first side, the second end having a fourth flange and extending outward from the second side of the beam and integrally formed as a portion of the second side, and wherein the third and fourth flanges are operable for connecting to respective sides of another column.

16. The method in accordance with claim 10 further comprising:

coupling a support frame structure to the support structure, the support frame structure defining an interior volume;

coupling a fluid distribution system to the support frame structure operable for distributing fluid within the interior volume defined by the support frame;

coupling heat transfer material to the support frame structure within the interior volume defined by the support frame structure operable for receiving fluid from the fluid distribution system through which the fluid travels; and coupling air moving equipment to the support frame structure operable for causing air to move through the heat transfer material.

17. A support structure comprising:

a first elongated column having a rectangular cross-sectional shape, comprising,
 a first side having an outer surface, a second side having an outer surface, a third side and a fourth side, and
 at least one aperture extending through the first column and through the first side and the second side of the first column;

a second elongated column having a rectangular cross-sectional shape, comprising,
 a first side having an outer surface, a second side having an outer surface, a third side and a fourth side, and
 at least one aperture extending through the second column and through the first side and the second side of the second column;

an elongated beam comprising,
 a first end and a second end,
 a first side and a second side with each side extending between the first end and the second end,
 a first flange having a first aperture and extending outward from the first end of the beam and integrally formed as a portion of the first side, the first flange positioned adjacent the outer surface of the first side of the first column such that the first aperture of the beam aligns with the aperture of the first column, a second flange having a second aperture and extending outward from the first end of the beam and integrally formed as a portion of the second side, the second flange positioned adjacent the outer surface of the second side of the first column such that the second aperture aligns with the aperture of the first column, a third flange having a third aperture and extending outward from the second end of the beam and integrally formed as a portion of the first side, the third flange positioned adjacent the outer surface of the first side of the second column such that the third aperture aligns with the aperture of the second column, and a fourth flange having a fourth aperture and extending outward from the second end of the beam and integrally formed as a portion of the second side, the fourth flange positioned adjacent the outer surface of the second side of the column such that the fourth aperture aligns with the aperture of the second column;

a first fastener extending through each of the first aperture, the second aperture and the aperture in the first column, operable for coupling the beam to the first column;

a second fastener extending through each of the third aperture, the fourth aperture and the aperture in the second column, operable for coupling the beam to the second column; and wherein the first and second flanges extend no further than the mid-point of the outer surface of the first side and the mid-point of the outer surface of the second side of the first column.

18. The structure in accordance with claim 17 wherein an inner wall of the first flange and an inner wall of the second flange are separated by a distance a1, and the outer surface of the first side of the first column and the outer surface of the second side of the first column are separated by a distance b1, and the distance a1 substantially equal to or greater than the distance b1, and wherein an inner wall of the third flange and an inner wall of the fourth flange are separated by a distance a2, and the outer surface of the first side of the second column and the outer surface of the second side of the second column are separated by a distance b2, and the distance a2 substantially equal to or greater than the distance b2.

19. The structure in accordance with claim 17 wherein the beam is a single unitary piece formed of pultruded composite fiber-reinforced plastic.

20. The structure in accordance with claim 19 wherein the first column and the second column are each a single unitary piece formed of pultruded composite fiber-reinforced plastic.

21. The structure in accordance with claim 17 further comprising:
a support frame structure defining an interior volume;
a fluid distribution system operable for distributing fluid within the interior volume defined by the support frame structure;
heat transfer material within the interior volume defined by the support frame structure and operable for receiving fluid from the fluid distribution system through which the fluid travels; and
air moving equipment operable for causing air to move through the heat transfer material.

22. The structure in accordance with claim 1 further comprising:

a support frame structure defining an interior volume;
a fluid distribution system operable for distributing fluid within the interior volume defined by the support frame structure;
heat transfer material within the interior volume defined by the support frame structure and operable for receiving fluid from the fluid distribution system through which the fluid travels; and
air moving equipment operable for causing air to move through the heat transfer material.

23. The structure in accordance with claim 1 wherein the first flange has an outer surface extending in the same plane as the first side of the beam.

24. The structure in accordance with claim 3 wherein the beam comprises a continuous piece of pultruded composite fiber-reinforced plastic that extends from an outer end of the first flange to an outer end of the second flange.

25. The structure in accordance with claim 7 wherein the first flange has an outer surface extending in the same plane as the first side of the beam.

26. The structure in accordance with claim 7 wherein an inner wall of the first flange and an inner wall of the second flange are separated by a distance a, and the outer surface of the first side of the column and the outer surface of the second side of the column are separated by a distance b, and the distance a substantially equal to or greater than the distance b.

27. The structure in accordance with claim 26 wherein the beam is a single unitary piece formed of pultruded composite fiber-reinforced plastic.

28. The structure in accordance with claim 27 wherein the beam comprises a continuous piece of pultruded composite fiber-reinforced plastic that extends from an outer end of the first flange to an outer end of the second flange.

29. The structure in accordance with claim 27 wherein the beam has an I-shaped cross-section.

30. The structure in accordance with claim 27 wherein the beam has a rectangular cross-sectional shape.

31. The structure in accordance with claim 27 wherein the first and second flanges are positioned at the first end of the beam, and the second end of the beam further comprises:
a third flange extending outward from the first side of the beam and integrally formed as a portion of the first side; and
a fourth flange and extending outward from the second side of the beam and integrally formed as a portion of the second side, and wherein the third and fourth flanges are operable for connecting to respective sides of another column.

32. The structure in accordance with claim 7 further comprising:
a support frame structure defining an interior volume;
a fluid distribution system operable for distributing fluid within the interior volume defined by the support frame structure;
heat transfer material within the interior volume defined by the support frame structure and operable for receiving fluid from the fluid distribution system through which the fluid travels; and
air moving equipment operable for causing air to move through the heat transfer material.

33. The structure in accordance with claim 8 wherein the first flange has an outer surface extending in the same plane as the first side of the beam.

34. The structure in accordance with claim 8 wherein an inner wall of the first flange and an inner wall of the second flange are separated by a distance a, and the outer surface of the first side of the column and the outer surface of the second side of the column are separated by a distance b, and the distance a substantially equal to or greater than the distance b.

35. The structure in accordance with claim 34 wherein the beam is a single unitary piece formed of pultruded composite fiber-reinforced plastic.

36. The structure in accordance with claim 35 wherein the beam comprises a continuous piece of pultruded composite fiber-reinforced plastic that extends from an outer end of the first flange to an outer end of the second flange.

37. The structure in accordance with claim 35 wherein the beam has an I-shaped cross-section.

38. The structure in accordance with claim 35 wherein the beam has a rectangular cross-sectional shape.

39. The structure in accordance with claim 35 wherein the first and second flanges are positioned at the first end of the beam, and the second end of the beam further comprises:
  a third flange extending outward from the first side of the beam and integrally formed as a portion of the first side; and
  a fourth flange and extending outward from the second side of the beam and integrally formed as a portion of the second side, and wherein the third and fourth flanges are operable for connecting to respective sides of another column.

40. The structure in accordance with claim 8 further comprising:
  a support frame structure defining an interior volume;
  a fluid distribution system operable for distributing fluid within the interior volume defined by the support frame structure;
  heat transfer material within the interior volume defined by the support frame structure and operable for receiving fluid from the fluid distribution system through which the fluid travels; and
  air moving equipment operable for causing air to move through the heat transfer material.

41. The method in accordance with claim 10 wherein the first flange has an outer surface extending in the same plane as the first side of the beam.

42. The method in accordance with claim 12 wherein the beam comprises a continuous piece of pultruded composite fiber-reinforced plastic that extends from an outer end of the first flange to an outer end of the second flange.

43. The method in accordance with claim 14 wherein the first flange has an outer surface extending in the same plane as the first side of the beam.

44. The method in accordance with claim 14 wherein an inner wall of the first flange and an inner wall of the second flange are separated by a distance a, and the outer surface of the first side of the column and the outer surface of the second side of the column are separated by a distance b, and the distance a substantially equal to or greater than the distance b.

45. The method in accordance with claim 44 wherein the beam is a single unitary piece formed of pultruded composite fiber-reinforced plastic.

46. The method in accordance with claim 45 wherein the beam comprises a continuous piece of pultruded composite fiber-reinforced plastic that extends from an outer end of the first flange to an outer end of the second flange.

47. The method in accordance with claim 44 wherein the column is a single unitary piece formed of pultruded composite fiber-reinforced plastic.

48. The method in accordance with claim 14 wherein providing the beam further comprises providing the beam having a second end, the second end having a third flange extending outward from the first side of the beam and integrally formed as a portion of the first side, the second end having a fourth flange and extending outward from the second side of the beam and integrally formed as a portion of the second side, and wherein the third and fourth flanges are operable for connecting to respective sides of another column.

49. The method in accordance with claim 14 further comprising:
  coupling a support frame structure to the support structure, the support frame structure defining an interior volume;
  coupling a fluid distribution system to the support frame structure operable for distributing fluid within the interior volume defined by the support frame;
  coupling heat transfer material to the support frame structure within the interior volume defined by the support frame structure operable for receiving fluid from the fluid distribution system through which the fluid travels; and
  coupling air moving equipment to the support frame structure operable for causing air to move through the heat transfer material.

50. The structure in accordance with claim 17 wherein the first flange has an outer surface extending in the same plane as the first side of the beam.

51. The structure in accordance with claim 19 wherein the beam comprises a continuous piece of pultruded composite fiber-reinforced plastic that extends from an outer end of the first flange to an outer end of the second flange.

52. A support structure comprising:
  a first elongated column having a rectangular cross-sectional shape, comprising,
    a first side having an outer surface, a second side having an outer surface, a third side and a fourth side, and
    at least one aperture extending through the first column and through the first side and the second side of the first column;
  a second elongated column having a rectangular cross-sectional shape, comprising,
    a first side having an outer surface, a second side having an outer surface, a third side and a fourth side, and
    at least one aperture extending through the second column and through the first side and the second side of the second column;
  an elongated beam comprising,
    a first end and a second end,
    a first side and a second side with each side extending between the first end and the second end,
    a first flange having a first aperture and extending outward from the first end of the beam and integrally formed as a portion of the first side, the first flange positioned adjacent the outer surface of the first side of the first column such that the first aperture of the beam aligns with the aperture of the first column,
    a second flange having a second aperture and extending outward from the first end of the beam and integrally formed as a portion of the second side, the second flange positioned adjacent the outer surface of the second side of the first column such that the second aperture aligns with the aperture of the first column,
    a third flange having a third aperture and extending outward from the second end of the beam and integrally formed as a portion of the first side, the third flange positioned adjacent the outer surface of the first side of the second column such that the third aperture aligns with the aperture of the second column, and a fourth flange having a fourth aperture and extending outward from the second end of the beam and integrally formed as a portion of the second side, the fourth flange positioned adjacent the outer surface of the second side of the column such that the fourth aperture aligns with the aperture of the second column;

a first fastener extending through each of the first aperture, the second aperture and the aperture in the first column, operable for coupling the beam to the first column;

a second fastener extending through each of the third aperture, the fourth aperture and the aperture in the second column, operable for coupling the beam to the second column; and wherein the first fastener is positioned at a location that is nearer to the third side of the first column than a fourth side of the first column.

53. The structure in accordance with claim 52 wherein the first flange has an outer surface extending in the same plane as the first side of the beam.

54. The structure in accordance with claim 52 wherein an inner wall of the first flange and an inner wall of the second flange are separated by a distance a1, and the outer surface of the first side of the first column and the outer surface of the second side of the first column are separated by a distance b1, and the distance a1 substantially equal to or greater than the distance b1, and wherein an inner wall of the third flange and an inner wall of the fourth flange are separated by a distance a2, and the outer surface of the first side of the second column and the outer surface of the second side of the second column are separated by a distance b2, and the distance a2 substantially equal to or greater than the distance b2.

55. The structure in accordance with claim 52 wherein the beam is a single unitary piece formed of pultruded composite fiber-reinforced plastic.

56. The structure in accordance with claim 55 wherein the beam comprises a continuous piece of pultruded composite fiber-reinforced plastic that extends from an outer end of the first flange to an outer end of the second flange.

57. The structure in accordance with claim 55 wherein the first column and the second column are each a single unitary piece formed of pultruded composite fiber-reinforced plastic.

58. The structure in accordance with claim 52 further comprising:

a support frame structure defining an interior volume;

a fluid distribution system operable for distributing fluid within the interior volume defined by the support frame structure;

heat transfer material within the interior volume defined by the support frame structure and operable for receiving fluid from the fluid distribution system through which the fluid travels; and air moving equipment operable for causing air to move through the heat transfer material.

* * * * *